United States Patent [19]
Carlson et al.

[11] Patent Number: 6,139,966
[45] Date of Patent: *Oct. 31, 2000

[54] CARBOXYLIC ACID FUNCTIONAL POLYURETHANE POLYMERS AND BLENDS THEREOF USED IN MAGNETIC RECORDING MEDIA

[75] Inventors: James G. Carlson; Jeffrey T. Anderson, both of Lake Elmo; Ramesh C. Kumar, Maplewood; Alvin M. Berg, Roseville, all of Minn.

[73] Assignee: Imation Corp., Oakdale, Minn.

[*] Notice: This patent is subject to a terminal disclaimer.

[21] Appl. No.: 09/131,520

[22] Filed: Aug. 10, 1998

Related U.S. Application Data

[62] Division of application No. 08/924,046, Aug. 28, 1997, Pat. No. 5,874,502, which is a division of application No. 08/576,616, Dec. 12, 1995, Pat. No. 5,759,666, and a continuation-in-part of application No. 08/258,401, Jun. 13, 1994, Pat. No. 5,705,253.

[51] Int. Cl.$^7$ .......................... B32B 27/20; B32B 27/30; B32B 27/40; G11B 5/702
[52] U.S. Cl. ................... 428/423.1; 428/425.9; 428/500; 428/520; 428/694 B; 428/694 BU; 428/694 BL
[58] Field of Search .............. 428/323, 694 B, 428/694 BU, 694 BL, 500, 520, 423.1, 425.9

[56] References Cited

U.S. PATENT DOCUMENTS

| | | | |
|---|---|---|---|
| 3,150,995 | 9/1964 | Bauer | 117/138.8 |
| 3,388,087 | 6/1968 | Dieterich et al. | 260/29.2 TN |
| 3,479,310 | 11/1969 | Dieterich et al. | 260/29.2 TN |
| 3,490,945 | 1/1970 | Slovinsky | 117/235 |
| 3,686,108 | 8/1972 | Reiff et al. | 260/29.2 TN |
| 3,870,684 | 3/1975 | Witt et al. | 260/75 NH |
| 3,873,484 | 3/1975 | Bluestein et al. | 260/29.2 TN |
| 3,971,764 | 7/1976 | Schurmann et al. | 260/77.5 AM |
| 4,238,378 | 12/1980 | Markusch et al. | 260/29.2 TN |
| 4,263,188 | 4/1981 | Hampton et al. | 260/29.2 TN |
| 4,271,217 | 6/1981 | Tanaka et al. | 428/96 |
| 4,286,022 | 8/1981 | Vermillion et al. | 428/423.1 |
| 4,529,661 | 7/1985 | Ninomiya et al. | 428/425.9 |
| 4,571,364 | 2/1986 | Kasuga et al. | 428/336 |
| 4,612,244 | 9/1986 | Kaneda et al. | 428/323 |
| 4,613,545 | 9/1986 | Chubachi et al. | 428/328 |
| 4,731,292 | 3/1988 | Sasaki et al. | 428/425.9 |
| 4,784,907 | 11/1988 | Matsufuji et al. | 428/328 |
| 4,784,913 | 11/1988 | Nakamura et al. | 428/411.1 |
| 4,784,914 | 11/1988 | Matsufuji et al. | 428/418 |
| 4,786,557 | 11/1988 | Kakuishi et al. | 428/418 |
| 4,788,103 | 11/1988 | Okita et al. | 428/425.9 |
| 4,861,683 | 8/1989 | Nakachi et al. | 428/694 |
| 4,898,803 | 2/1990 | Aoai et al. | 430/191 |
| 4,983,491 | 1/1991 | Aoai et al. | 430/175 |
| 5,034,271 | 7/1991 | Miyoshi et al. | 428/323 |
| 5,064,720 | 11/1991 | Kempo et al. | 428/423.1 |
| 5,164,239 | 11/1992 | Ozawa et al. | 428/64 |
| 5,165,999 | 11/1992 | Ushimaru et al. | 428/425.9 |
| 5,221,582 | 6/1993 | Yamakawa | 428/425.9 |
| 5,244,739 | 9/1993 | Carlson et al. | 428/425.9 |
| 5,384,362 | 1/1995 | Carlson et al. | 525/77 |
| 5,498,685 | 3/1996 | Carlson et al. | 528/71 |
| 5,510,187 | 4/1996 | Kumar et al. | 428/425.9 |
| 5,512,651 | 4/1996 | Carlson et al. | 528/73 |
| 5,705,253 | 1/1998 | Berg et al. | 428/141 |
| 5,759,666 | 6/1998 | Carlson et al. | 524/364 |

FOREIGN PATENT DOCUMENTS

| | | |
|---|---|---|
| 53-38760 | 10/1978 | Japan . |
| 3/188178 | 8/1991 | Japan . |
| 4/307420 | 10/1992 | Japan . |
| 6/80528 | 10/1994 | Japan . |
| 719355 | 3/1995 | Japan . |

OTHER PUBLICATIONS

G. Odian, Principles of Polymerization, 3rd Edition, John Wiley & Sons, p. 2, Dec. 1991.

Chujo et al., "Synthesis of Polyurethan Graft Copolymers by Polyaddition Reaction of Dihydroxyl–Terminated Macromonomers," Polymer Bulletin 8, pp. 239–244 (1982).

Kunststoff–Handbuch 7, "Polyurethane," Hanser, $2^{nd}$ Ed., pp. 22–25 (1983).

Swaraj, "Surface Coatings, Science and Technology," John Wiley and Sons, pp. 586–591 (1985).

*Primary Examiner*—Paul Thibodeau
*Assistant Examiner*—Ramsey Zacharia

[57] ABSTRACT

The invention provides novel macromonomer and carboxyl functional polyurethanes having a high carboxyl content. The invention further provides dispersions, coatings and magnetic recording media comprising these polyurethanes, or blends or copolymers of these polyurethanes with quaternary ammonium compounds. The invention further provides novel dispersions, coatings and magnetic recording media comprising combinations of carboxyl functional polyurethanes having a high carboxyl content with quaternary ammonium polymers.

18 Claims, No Drawings

CARBOXYLIC ACID FUNCTIONAL POLYURETHANE POLYMERS AND BLENDS THEREOF USED IN MAGNETIC RECORDING MEDIA

"This is a division of application Ser. No. 08/924,046, filed Aug. 28, 1997, now U.S. Pat. No. 5,874,502, which is a division of application Ser. No. 08/576,616, filed Dec. 12, 1995, now U.S. Pat. No. 5,759,666 issued Jun. 02, 1998; and a continuation-in-part of application Ser. No. 08/258,401, filed Jun. 13, 1994, now U.S. Pat. No. 5,705,253."

FIELD OF THE INVENTION

This invention relates to novel polyurethane polymers with a graft architecture having a backbone with carboxylic acid functionality. These will hereafter be designated as "graft carboxyl polyurethanes". The invention further relates to novel dispersions, coatings, and magnetic recording media containing these graft carboxyl polyurethane polymers as dispersants and binders for magnetic and/or non-magnetic pigments. The invention further relates to dispersions, coatings and magnetic recording media comprising graft carboxyl polyurethanes in combination with quaternary ammonium compounds.

The invention further relates to the use of a toughened polyisocyanate curative in combination with the novel graft carboxyl polyurethanes in dispersions, coatings, and magnetic recording media.

The invention further relates to the use of carboxylic acid functional polyurethanes not having a graft structure but having a carboxylic acid content of greater than 0.2 milliequivalents of carboxyl group per gram of polymer (hereafter designated as "carboxyl polyurethanes") in combination with a quaternary ammonium polymer and, optionally, a toughened polyisocyanate curative in dispersions, coatings, and magnetic recording media.

The invention further relates to graft carboxyl polyurethanes which are prepared from a reaction mixture containing a quaternary ammonium functional polyol, as well as a carboxylic acid functional polyol and other components. The invention further relates to the use of these quaternary ammonium graft carboxyl polyurethanes in dispersions, coatings, and magnetic recording media.

BACKGROUND OF THE INVENTION

Magnetic recording media generally include a binder dispersion layer comprising a binder and one or more pigments overlying a substrate, wherein the pigments are dispersed within the binder. Typically, the pigments are magnetizable pigments comprising small, magnetizable particles. In some instances, the medium may be in the form of a composite having both back-coat and front-coat binder dispersion layers, although the pigment in the back-coat may or may not be a magnetizable pigment.

It has become desirable to have as high a loading of magnetizable pigment in the magnetic recording media as is reasonably possible. It is often preferred to have a binder dispersion comprising from about 70% to 85% by weight magnetizable pigment relative to the binder with as many magnetizable particles per unit area or unit volume as possible. It is also preferred to have a binder dispersion in which the magnetizable pigment comprises a plurality of small particles having a relatively high specific surface area. Higher pigment loading has the potential to provide high density magnetic recording media capable of storing more information.

Problems, however, remain in the art concerning magnetic recording media having a relatively high loading of very high surface area magnetizable pigment. To begin with, magnetizable pigments tend to agglomerate, and they are difficult to properly and fully disperse within the binder. Wetting agents, or dispersants, are often employed to facilitate such dispersion. For higher pigment loading, that is, the use of greater amounts by weight and number of magnetizable particles, greater amounts of such dispersants are required, which is not always desirable.

There are a number of reasons for using as little dispersant as possible. Dispersants tend to soften binder systems, decrease their toughness, and adversely affect their cure. Binders without dispersants can be more readily and reproducibly prepared. Further, excess dispersant may bloom from a cured binder system over time, leading to contamination of a recording head or the like, causing a change in the physical or chemical characteristics of the media.

To help alleviate these problems with added dispersants, polymeric dispersant binder compositions having chemically bound dispersants have been developed. Such compositions comprise polymers with polar functional moieties pendant from the polymer backbone that help disperse pigments. As a result of using these compositions, less dispersant or, in some instances, no dispersant is needed for dispersion of magnetic pigment in the binder. Commercially available polymeric dispersants for magnetic recording media applications typically contain a relatively low quantity of polar functional moieties, which are usually carboxyl or sulfonate groups present at levels less than about 0.1 milliequivalents of carboxyl or sulfonate group per gram or polymer. A higher degree of pigment-polymer interaction is often desired for purposes of dispersion and coatings stability, particularly in the case of pigments exhibiting small particle size, such as iron metal particles and barium ferrite.

Polyurethanes containing high levels of carboxylic acid functionality are known. U.S. Pat. Nos. 4,983,491 and 4,898,803 to Fuji describe polyurethanes said to be useful in a photolithographic application which are the reaction product of a diol having a carboxyl group with a diisocyanate. These materials have a carboxylic acid content of greater than 1.0 meq/g. Their use of these polyurethanes is unrelated to dispersion formation or magnetic recording. Graft carboxyl polyurethanes are not taught.

U.S. Pat. No. 4,571,364 (to Fuji Photo Film Co.) discloses polyurethane resins for magnetic binders in which polar groups including carboxyl, may be incorporated into the polymer. The claimed polar group content is greater than 0.1 meq/q. The sole example of a polyurethane containing carboxyl groups is Example 3. Example 3 is described in a referenced Japanese Patent Publication (No. 38760/78) to contain a water based polyurethane which is said to have 0.5 meq/g carboxyl groups. U.S. Pat. No. 4,788,103 to Fuji Photo Film Co. describes polyurethanes used as magnetic pigment binders having 0.03 to 2 weight percent carboxyl group (0.007 to 0.4 meq/g). Neither combinations with quaternary ammonium compounds nor graft side chains are taught.

U.S. Pat. Nos. 4,529,661 and 4,613,545 to Sony Corp. describe binders, including polyurethane binders, having polar groups, including carboxyl groups, at levels of from 200 to 50,000 grams of polymer per mole of polar group (0.02 to 5 meq/g). There are no examples of carboxyl containing polyurethanes in these patents.

U.S. Pat. No. 5,165,999 to Fuji Photo Film describes polyurethanes prepared from amino carboxylic acid diols used in magnetic recording media. Blending with a vinyl chloride type resin containing a polar group including quaternary ammonium polar group is also described. The claims are expressed in terms such that a carboxyl content range cannot be calculated. The level of carboxylic acid functionality in the examples is about to 0.07 meq/g (about 14,000 grams polymer per mole of carboxyl group).

Copending U.S. patent application Ser. No. 08/054,511 and U.S. patent application Ser. No. 08/054,312, assigned to the assignee of the present invention, describes the use of polyurethanes with chelating carboxyl groups pendant from their backbone as magnetic recording media binders. These carboxyl groups are not formed from the copolymerization of carboxylic acid functional polyols but rather are formed from the reaction of an anhydride with a hydroxyl functional polyurethane. It is difficult to prepare a polyurethane with high carboxyl content, high macromonomer content and high molecular weight by this method because a precursor polyurethane must be prepared having a high level of free hydroxyl groups. The claimed range of such carboxyl groups is 1000 to 100,000 g/eq (0.01 to 1.0 meq/g) and in some cases they can also incorporate a vinyl polymerized macromonomer and be blended with polymers having quaternary ammonium salts.

U.S. Pat. No. 5,244,739 assigned to the assignee of the present invention, describes the use of vinyl polymeric macromonomer diols in polyurethane polymers useful in magnetic recording media. A sulfonate polar group was incorporated into some of these polymers al levels of 5000 to 30,000 g/eq (0.03 to 0.2 meq/g). Carboxyl polar groups are not taught.

Quaternary ammonium functional polymers are known to the magnetic recording media art. Examples of quaternary ammonium functional polymers include vinyl chloride copolymers, non-halogenated styrene copolymers, polyurethanes and polyethers.

Examples of quaternary ammonium functional polyurethane magnetic binders include those disclosed in U.S. Pat. No. 4,286,022 (to 3M Co.), Japanese Patent Publication No. 03/188178, 04/307420, Japanese Patent Publication No. 06/80528 and Japanese Patent Publication No. 95/19355.

Quaternary ammonium functional vinyl chloride copolymer magnetic binders are known and commercially available. Examples are described in U.S. Pat. No. 4,784,913 (to Nippon Zeon Co., Ltd.), and U.S. Pat. No. 4,861,683 (to Sekisui Chemical Company, Ltd.).

Quaternary ammonium functional nonhalogenated vinyl copolymers are described in copending U.S. patent application Ser. No. 08/054,312, assigned to the assignee of the present invention, which describes their use as magnetic binders.

Isocyanate functional polyurethane prepolymers containing oligomeric polyol segments used in magnetic recording media formulations are described in U.S. Pat. Nos. 3,150,005; 3,490,945 and 5,221,582.

SUMMARY OF THE INVENTION

A need exists for a binder composition which is capable of very strong binding of pigment particles yet which produces smooth, high loading dispersions with fluid rheology. For magnetic recording media applications, there is a need to obtain pigmented coatings with excellent magnetic and mechanical properties, as well as backside coatings which are smooth and durable.

We have discovered such a binder, magnetic media produced therefrom and from other binders, and magnetic and non-magnetic pigmented coatings produced therefrom. We have found that polyurethanes containing high levels of carboxyl functionality and graft side chains (termed "graft carboxyl polyurethanes") can produce fluid dispersions from many different pigments, including difficult to disperse magnetic pigments, at high ratios of pigment to binder.

Without wishing to be bound by any particular theory, it is speculated that the graft side chains of the novel graft carboxyl polyurethanes of the invention act as polymeric barriers between particles in a dispersion, preventing flocculation (i.e., steric stabilization). We have found that the novel graft carboxyl polyurethanes of this invention are more effective at providing stabilization to magnetic particle dispersions than any other polyurethanes of which we are aware.

We have found that the combination of graft carboxyl polyurethanes with a quaternary ammonium compound, or the incorporation of a quaternary ammonium polyol into the graft carboxyl polyurethane, can produce even more fluid dispersions which show improved gloss and, when magnetic particles are used, magnetic orientation. Though the carboxyl polyurethanes of the invention interact strongly with pigments, this surprisingly does not interfere with the dispersion stabilization action of the quaternary ammonium compound when present. It is speculated that the two components operate by independent mechanisms to provide dispersion stabilization.

We have found that, since the graft carboxyl polyurethanes of the invention are such efficient dispersants, it is possible to add high levels of very tough polyisocyanate curatives to dispersions prepared from them, without sacrificing dispersion quality. Such curative containing dispersions can be coated, dried and cured to produce coatings of distinctly superior properties. In particular these properties include high toughness, good durability, good slit edge quality and high magnetic recording output.

While graft side chains provide excellent improvements in dispersion stability, they do not always contribute strongly to polymer mechanical properties. We have found that combinations of non-grafted but highly carboxylated polyurethanes, which we term "carboxyl polyurethanes", with quaternary ammonium polymers can produce acceptable dispersions. This binder combination has a similar level of carboxyl functionality and thus a similar level of pigment polymer interaction to that of the graft carboxyl polyurethanes. Toughened polyisocyanate curatives can optionally be added to these dispersions to yield, when coated, coatings with highly desirable properties of toughness and environmental stability.

One aspect of the invention relates to a novel carboxylic acid functional graft carboxyl polyurethane polymer comprising the reaction product of a mixture comprising:

(a) one or more polyisocyanates;
(b) a macromonomer(s) having a number average molecular weight greater than about 500 and one to two isocyanate-reactive groups (groups which are reactive with isocyanate) selected from the group consisting of hydroxyl, primary amino, secondary amino and mercapto groups; and wherein if two isocyanate-reactive groups are present, they are separated by no more than about 10 atoms within the macromonomer molecule;
(c) a carboxylic acid functional polyol;
(d) optionally one or more quaternary ammonium polyols;
(e) optionally one or more polyols, wherein the polyols(s) of element (e) are defined to exclude components of element(s) (b), (c), and (d);

wherein the number of isocyanate-reactive groups present in the mixture prior to reaction exceeds the number of isocyanate groups; and wherein the macromonomer (b) content comprises from about 5% to about 95% by weight based on the weight of the graft carboxyl polyurethane polymer; and wherein at least about 0.2 meq of carboxylic acid groups are present on the graft carboxyl polyurethane polymer per gram of graft carboxyl polyurethane polymer. Preferably the macromonomer content comprises from about 20% to about 80% by weight based on the weight of the polymer. Preferably at least about 0.4 meq of carboxylic acid group are present on the polymer per grain of polymer.

The reactants can be added to the reaction mixture in a various ways to produce the polyurethanes of the present invention. For example, (a), (b) and (c) may be allowed to react to completion followed by addition of (d) and/or (e) or, alternatively, (a), (b), (c), (d), and (e) may be added together and allowed to react until all isocyanate groups are consumed. Alternatively (a), (b), (c), and (d) may be combined and allowed to react followed by the addition of and reaction with (e). As another example (a), (b), (c), and (e) may be combined to react until all isocyanate groups are consumed. Typically a solvent is used and the product is solvent soluble. The product has a backbone rich in acid groups and has a graft structure whose pendant (graft) side chains are the result of the reaction of the macromonomer into the polyurethane. A non-limiting example of such a polymerization is shown below as Reaction I:

Another aspect of the invention relates to a dispersion comprising:
(a) one or more of the graft carboxyl polyurethane polymers described above;
(b) optionally a quaternary ammonium compound(s);
(c) one or more pigments selected from the group consisting of magnetic pigments, non-magnetic pigments, and mixtures thereof;
(d) an organic solvent; and
(e) optionally a polyisocyanate curative.

Preferably about 0.3 to about 30 millimoles of quaternary ammonium group are present in the dispersion per kilogram of pigment.

Preferably about 20 to about 60 weight percent of the polyisocyanate curative (e) is present in the coating based upon the total weight of the coating exclusive of pigment, wherein the curative (e) is the reaction product of a mixture comprising:
(i) one or more diisocyanates; and
(ii) one or more polyols;
wherein at least one of the polyols of (ii) is an oligomeric polyol of number average molecular weight between about 500 and 5000 having a glass transition temperature less than about 0° C. and wherein said oligomeric polyol comprises between about 10 and about 80% by weight of the curative and wherein the overall ratio of hydroxyl to isocyanate functionality in the mixture of element (e) prior to reaction is less than 1.

Another aspect of the invention relates to a coating comprising this dispersion dried of solvent.

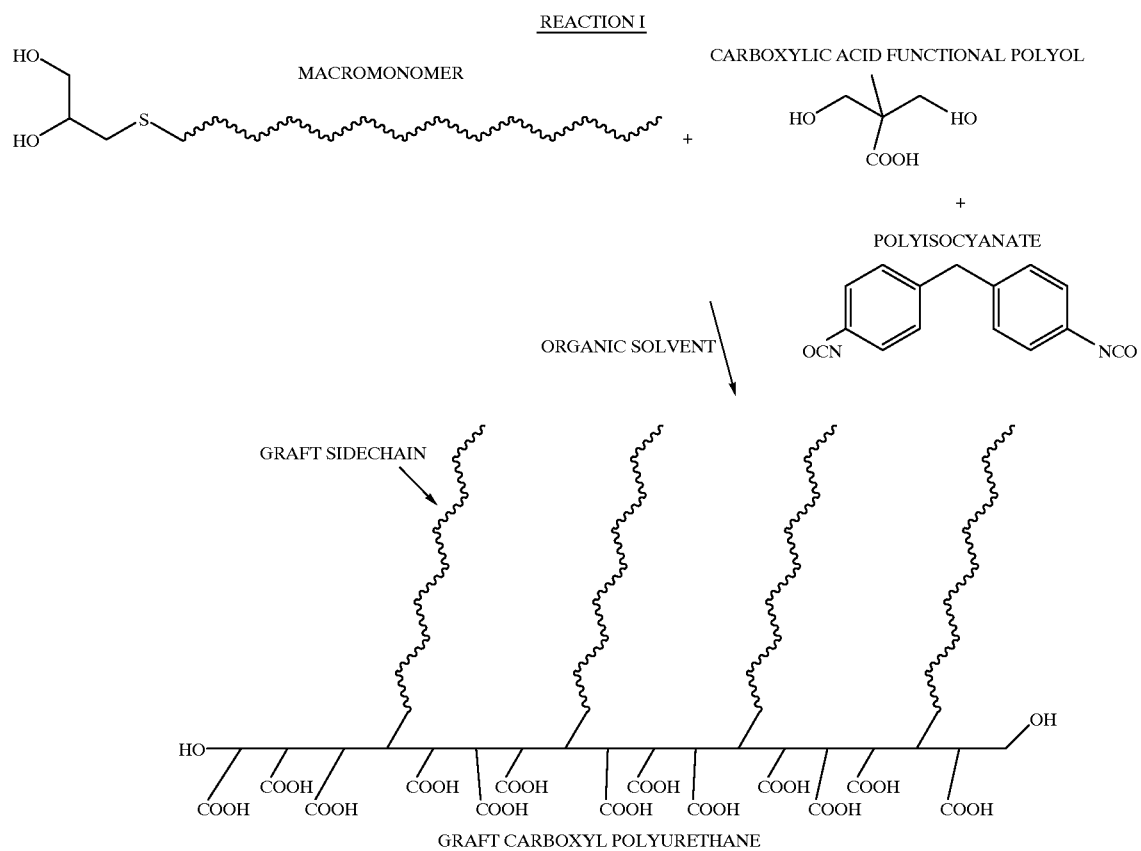

Another aspect of the invention relates to a magnetic recording medium comprising the above coating on at least one side of a substrate.

Another aspect of the invention relates to a dispersion comprising:

(a) one or more of carboxyl polyurethane polymers comprising the reaction product of a mixture comprising:
   (i) one or more polyisocyanates;
   (ii) a carboxylic acid functional polyol(s);
   (iii) optionally one or more polyols, wherein the polyols(s) of element (iii) are defined to exclude components of element(s) (a)(ii);
   wherein the number of isocyanate-reactive groups present in the mixture prior to reaction exceeds the number of isocyanate groups and wherein at least about 0.2 meq of carboxylic acid group are present on the carboxyl polyurethane polymer per gram of carboxyl polyurethane polymer;

(b) a polymeric quaternary ammonium compound(s) having a number average molecular weight of at least about 500;

(c) one or more pigments selected from the group consisting of magnetic pigments, non-magnetic pigments, and mixtures thereof; and (d) an organic solvent; and (e) optionally a polyisocyanate curative.

Preferably about 20 to about 60 weight percent of the polyisocyanate curative (e) is present in the coating based upon the total weight of the coating exclusive of pigment, wherein the curative (e) is the reaction product of a mixture comprising:

(i) one or more diisocyanates; and
(ii) one or more polyols;

wherein at least one of the polyols of (ii) is an oligomeric polyol of number average molecular weight between about 500 and 5000 having a glass transition temperature less than about 0° C. and wherein said oligomeric polyol comprises between about 10% and about 80% by weight of the curative and wherein the overall ratio of hydroxyl to isocyanate functionality in the mixture of element (e) prior to reaction is less than 1.

Another aspect of the invention relates to a coating comprising this dispersion dried of solvent.

Another aspect of the invention relates to a magnetic recording medium comprising the above coating on at least one side of a substrate.

The use of the above mentioned polyisocyanate curatives in the dispersions and coatings of the invention is particularly effective. The use of relatively high levels of these tough curatives provides a large increase in the toughness of the finished coatings when the dispersions are dried. Up to about 60% by weight of the binder materials in the coatings of this invention can be curative.

DETAILED DESCRIPTION OF THE INVENTION

The present invention provides novel graft carboxyl polyurethane polymers and magnetic media dispersions and coatings comprising said polymers. The invention further provides novel magnetic recording media comprising non-grafted carboxyl polyurethane polymers in combination with polymeric quaternary ammonium compounds.

I. Graft Carboxyl Polyurethane Polymers and Carboxyl Polyurethane Polymers

The polymers useful in the present invention may be prepared by the reaction of the desired components in the presence or absence of a solvent. Preferably, the polymerization is carried out in the presence of an organic solvent selected from the group consisting of methylethyl ketone, tetrahydrofuran, methylisobutyl ketone, cyclohexanone, toluene and mixtures thereof. Most preferably, the solvent is selected from the group consisting of methylethyl ketone and tetrahydrofuran.

A catalyst may be added to promote the reaction, i.e., a tin catalyst such as dibutyltin dilaurate. The reaction components may be introduced into the reaction medium individually in stepwise fashion in order to decrease the random nature of the copolymer. Alternatively, all of the constituent ingredients may be added to the reaction medium prior to initiating the reaction, in a batch polymerization process, which produces an essentially random polyurethane copolymer. The order of addition of ingredients may have an effect on the viscosity of the resultant polyurethane, and a skilled practitioner would be able to determine which order will produce a desired viscosity.

Typically, to prepare the novel graft carboxyl polyurethane of the invention, a reaction mixture of a carboxylic acid functional polyol, a macromonomer having isocyanate-reactive groups, an optional polyol, a polyisocyanate, an optional catalyst and solvent is charged to a vessel such that the ratio of isocyanate groups to isocyanate-reactive groups is less than one. The reaction is typically heated to about 80° C. with stirring under anhydrous conditions until the reaction is complete. The polymer product contains side chains which comprise about 5% to about 95%, preferably about 20 to about 80%, of the polymer's total weight, which are derived from the macromonomer. When the macromonomer has only one isocyanate-reactive group, it is preferred to use at least an equimolar amount of a triol in order for the polymerization to achieve a high molecular weight. The number average molecular weight of the product is typically about 2000 to about 50,000, preferably about 5000 to about 30,000.

Typically, to prepare a carboxyl polyurethane without a graft structure, the synthetic procedure is the same as for the graft carboxyl polyurethane except that no macromonomer is included in the reaction.

I(a). Polyol

The term "polyol" as used herein refers to polyhydric alcohols containing an average of one or more hydroxyl groups and includes, for example, monohydric alcohols, diols, triols, tetrols, etc.

I(a)(i). Diols

A preferred class of polyols is diols. A variety of diols may be utilized according to the invention including both low molecular weight and oligomeric diols. Also, mixtures of diols can be used.

I(a)(i)(1) Low Molecular Weight Diols

Low molecular weight (less than about 500 number average molecular weight) diols may be used to provide preferred hardness characteristics to the polymer and the magnetic media prepared therefrom. Some representative examples of these are ethylene glycol; propylene glycol; 1,3-propane diol; 1,4-butane diol; 1,5-pentane diol; 1,6-hexane diol, neopentyl glycol; diethylene glycol; dipropylene glycol; 2,2,4-trimethyl-1,3-pentane diol; 1,4-cyclohexanedimethanol; ethylene oxide and/or propylene oxide adduct of bisphenol A; and ethylene oxide and/or propylene oxide adduct of hydrogenated bisphenol A. Examples of other diols which may be useful include diols having polar functional groups, diols bearing ethylenic unsaturation, such as 3-allyloxy-1,2-propanediol, 1-glyceryl (meth)acrylate, 2-glyceryl (meth)acrylate, 2-methylene-1,3-propane diol, pentacrythritol di(meth)acrylate, trimethylolpropane monoallyl ether, 2-acrylamido-2-hydroxyethyl-1,3-propanediol, N,N-diallyltartardiamide and N-allyl-2,2'-iminodiethanol, and fluorinated diols such as $C_8F_{17}SO_2N[(CH_2)_2OH]_2$. It is further noted that for any of the reactants mentioned, mixtures of materials can be utilized.

I(a)(i)(2) Oligomeric Diols

A preferred class of polyols is oligomeric polyols defined as polyols having a number average molecular weight between about 500 and about 5000. Preferred members of this class are polyester diols, polyether diols and polycarbonate diols having a hydroxyl equivalent weight of from about 250 to about 3,000 (g/eq). Such materials include polyester (polycaprolactone) diols such as TONE™ 0210, available from Union Carbide Company, having a hydroxyl equivalent weight of about 415. Another such material is Ravecarb™ 106, a polycarbonate diol from Enichem America, Inc. having a number average molecular weight of about 2000 (polyhexanediol carbonate).

Other useful oligomeric polyols include but are not limited to those selected from the group consisting of: polyether diols such as polytetramethylene glycols and polypropylene glycols; polyester diols such as a polyester diol that is the reaction product of a mixture of adipic and isophthalic acids and hexane diol; polyether triols; and polyester triols. It is further noted that for any of the reactants mentioned, mixtures of materials can be utilized.

I(a)(ii). Macromonomers

A variety of macromonomers can be used according to the present invention. In order to be used in this invention, a macromonomer must have a number average molecular weight of at least about 500 (preferably between about 500 and about 10,000) and it must have either one or two groups pendant from the backbone of the polymeric material which are reactive towards isocyanate (isocyanate-reactive groups). It is further required that, when two isocyanate-reactive groups are present, they are separated from each other by less than about 10 atoms. This ensures the formation of a graft or comb structure when the macromonomers are incorporated into the polyurethanes of the invention. For purposes of this invention, isocyanate-reactive groups are the following: hydroxyl, mercapto, primary amino, and secondary amino. Typically the one or two isocyanate reactive groups pendant from the backbone of the macromonomer are located at one end of the macromonomer molecule and the rest of the molecule is soluble in solvents used to prepare the polymers and dispersions of the invention Some general structures of typical macromonomers are shown below:

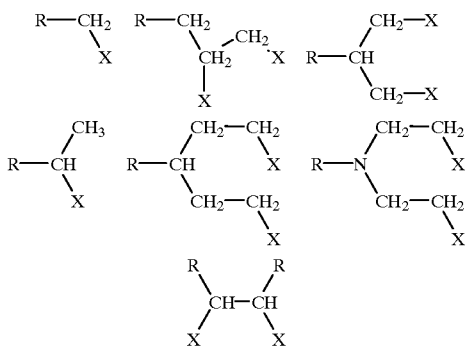

where X is an isocyanate-reactive group and R is a polymeric group (preferably an organic polymeric group) of number average molecular weight greater than about 500 having no isocyanate-reactive groups.

When copolymerized into a polyurethane polymer, macromonomers become the source of pendant polymeric segments (i.e. the "R" polymeric groups). The graft-carboxyl polyurethane backbone typically possesses on average about 0.5 to about 5 pendant polymeric segments. The weight ratio of the polyurethane backbone to the pendant polymeric segment(s) ranges typically from about 95:5 to about 5:95, preferably about 80:20 to about 20:80. The number average molecular weight of each pendant polymeric segment, and the macromonomer used in forming it, typically ranges from about 1000 to about 20,000, preferably about 3000 to about 10,000. The glass transition temperature of the pendant polymeric segment(s) typically range from about −60° C. to about 150° C. For magnetic binder use, a preferred mode is to prepare a polyurethane using a high glass transition temperature macromonomer, typically above about 50° C., preferably about 80° C. to 110° C. in order to obtain high hardness, stiffness and dimensional stability. It is also preferred to prepare polyurethanes that are tougher but not as hard, using lower Tg macromonomers such as hydroxyl functional polylactone macromonomers.

Macromonomers useful in the current invention can be prepared by polymerization methods known to those skilled in the art including, for example, radical polymerization, anionic polymerization, cationic polymerization, condensation polymerization, and ring opening polymerizations. Some preferred materials described below are vinyl polymeric macromonomer diols prepared by polymerization of vinyl monomers and polylactone macromonomer alcohols obtained by ring opening polymerization.

I(a)(ii)(1) Hydroxyl Functional Vinyl Polymeric Macromonomers

A hydroxyl functional vinyl polymeric macromonomer is, for purposes of this invention, a diol or monohydric alcohol containing a vinyl polymeric segment which contains no additional isocyanate-reactive groups. It provides a method of incorporating vinyl polymeric segments into polyurethane polymers. These hydroxyl functional vinyl polymeric macromonomers can be prepared by conventional methods known to those skilled in the art, such as those described in Chuyo et al., *Polymer Bulletin*, 8, 239 (1982). That reference teaches that vinyl monomers may be free radically polymerized in the presence of mercaptopropanediol to give a vinyl polymeric segment terminated by a moiety containing two hydroxyl groups. This gives a diol of the following general structure:

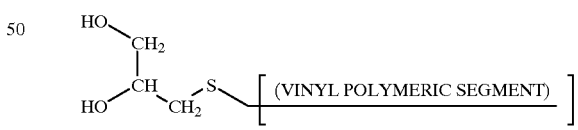

Hydroxyl functional vinyl polymeric macromonomers may also be prepared by anionic, cationic, and group transfer polymerization methods.

Some hydroxyl functional vinyl polymeric macromonomers are available commercially. Examples of useful hydroxyl functional vinyl polymeric macromonomers include but are not limited to those available from Toagosei Chemical Industry Co., Ltd. that have a number average molecular weight of about 6000 and possess diol functionality at one end. The hydroxyl functional vinyl polymeric macromonomer can comprise methylmethacrylate monomer, (available under the trade designation HA-6 from Toagosei), styrene monomer (available under the trade designation HS-6 from Toagosei), and a combination of styrene and acrylonitrile monomer (available under the trade designation HN-6 from Toagosei).

Other polymerizable monomers can be used in preparing useful hydroxyl functional vinyl polymeric macromonomers. Examples of monomers which are useful in preparing hydroxyl functional vinyl polymeric macromonomers which are useful in preparing the copolymers of the present invention include but are not limited to those selected from the group consisting of styrene, halogenated styrenes, alkylated styrenes, methoxystyrenes, acrylonitrile, acrylamide, methacrylamide, methylmethacrylate, methyl acrylate, ethyl acrylate, isopropyl acrylate, n-butyl acrylate, 2-ethylhexyl acrylate, isobornyl acrylate, glycidyl acrylate, vinyl chloride, vinylidene chloride, vinyl acetate, vinylidene fluoride, N-ethylperfluorooctanesulfonamidoethyl acrylate, N-ethylperfluorooctanesulfonamidoethyl methacrylate, N-butylperfluorooctanesulfonamidoethyl acrylate, N-butylperfluorooctanesulfonamidoethyl methacrylate, N-methylperfluorooctanesulfonamidoethyl acrylate, N-methylperfluorooctanesulfonamidoethyl methacrylate, other acrylic acid esters and amides, other methacrylic acid esters and amides, and mixtures thereof. Preferably, the monomer is selected from the group consisting of styrene, methylmethacrylate, and a mixture of styrene and acrylonitrile.

I(a)(ii)(2) Hydroxyl Functional Polylactone Macromonomers

Hydroxyl functional polylactone macromonomers can also be used to produce the novel graft-polyurethanes of the invention. These hydroxyl functional polylactone macromonomers can be prepared by the ring opening polymerization of lactones which is initiated by a monohydric primary alcohol in the presence of heat and catalysts. An example, where the lactone is caprolactone and the product is a hydroxyl functional polycaprolactone macromonomer is shown in Reaction II below:

REACTION II

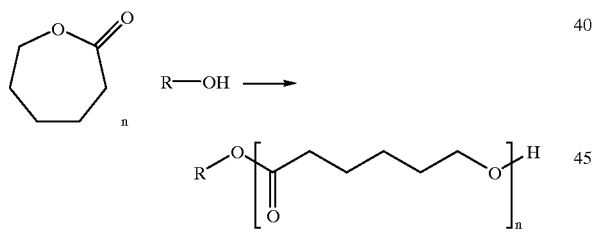

We have found that such monohydric alcohol macromonomers can be used effectively to produce the dispersing polyurethanes of the invention. It is preferred that an equimolar or greater amount of a triol be incorporated into the polyurethane polymerization reaction mixture along with the macromonomer. The triol compensates for the monofunctionality of the polylactone macromonomer and allows the polyurethane polymerization reaction to achieve high molecular weights if desired.

Graft carboxyl polyurethanes prepared from caprolactone alcohols are very effective in wetting and dispersing pigments and the polycaprolactone chains contribute a desirable level of toughness.

A variety of lactones can be used in place of caprolactone including, but not limited to: propiolactone butyrolactone, and pivalolactone.

Many monohydric primary alcohols can be used to initiate lactone polymerization to prepare hydroxyl functional polylactone macromonomers. Examples include: short chain alcohols such as butanol or octanol, long chain alcohols such as stearyl alcohol, fluorochemical alcohols and others.

The molecular weight of the hydroxyl functional polylactone macromonomer is regulate by the amount of monohydric primary alcohol initiator present. Number average molecular weights of from 500 to 10,000 are typical. The preferred number average molecular weight range of the polycaprolactone macromonomer alcohols is from about 1000 to about 5,000.

I(b) Carboxylic Acid Functional Polyols

Examples of useful carboxylic acid functional polyols include but are not limited to those selected from the group consisting of diols containing a carboxylic acid functional group directly bonded to the backbone of the diol though a carbon-carbon bond of the formula:

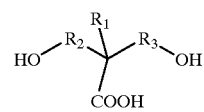

CARBOXYLIC ACID FUNCTIONAL POLYOl where $R_1$ is an alkyl group of 5 carbons or less and where $R_2$ and $R_3$ are independently selected from the group consisting of alkyl groups; aryl groups; aralkyl groups; polyester segments; polyether segments; and polycarbonate segments. Preferred carboxylic acid polyols are 2,2-bis-hydroxymethylpropionic acid and carboxylic acid functional polyester polyols (where $R_2$ and $R_3$ are independently selected from the group consisting of polyester segments) which are prepared by the polyesterification reaction of 2,2-bis-hydroxymethylpropionic acid with diacids and diols. The reaction can be run such that the product is hydroxyl terminated and contains free carboxyl groups from the 2,2-bis-hydroxymethylpropionic acid. Examples of this procedure and suitable carboxylic acid functional polyester polyols are given in Japanese Patent application No. 53/38760. A preferred commercially available material of this type is sold under the trade designation "Lexorez™ 1405-65" from Inolex Corporation which has a hydroxyl content of about 850 grams polyol per mole of hydroxyl group and a carboxyl content of about 1100 grams polyol per mole of carboxyl group. Combinations of carboxylic acid functional polyols can be used to obtain preferred properties of hardness and toughness.

I(c). Polyisocyanates

A wide variety of polyisocyanates may be utilized according to the present invention. "Polyisocyanates" means any organic compound that has two or more reactive isocyanate (i.e., —NCO) groups in a single molecule that can be aliphatic, alicyclic, aromatic or a combination thereof. This definition includes diisocyanates, triisocyanates, tetraisocyanates, etc., and mixtures thereof. Preferably, diisocyanates are used. Useful diisocyanates include but are not limited to those selected from the group consisting of diphenylmethane diisocyanate, isophorone diisocyanate, toluene diisocyanate, hexamethylene diisocyanate, tetramethylxylene diisocyanate, and p-phenylene diisocyanate. It is noted that mixtures of diisocyanates can also be used.

II. Quaternary Ammonium Compounds

A variety of quaternary ammonium compounds are useful in the present invention. These materials may be, for example, either low molecular weight or polymeric materials such as those defined by the formula:

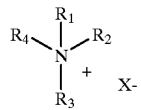

where $R_1$, $R_2$, $R_3$, and $R_4$ are each independently selected from the group consisting of alkyl groups, aryl groups, aralkyl groups, polyether segments, polyester segments, and other polymeric segments; and $X^-$ is an anion selected from the group consisting of chloride, bromide, sulfate, methosulfate, sulfonate, phosphate, phosphonate, and carboxylate. The anion is preferably chloride. Preferably one to two of the groups selected from the group consisting of $R_1$, $R_2$, $R_3$, $R_4$ are polymeric segments, most preferably one group. By polymeric segments it is meant that a group has a number average molecular weight of at least about 500.

It is preferred that the quaternary ammonium compounds be soluble in the dispersion solvent. "Soluble" quaternary ammonium compounds are defined here as those capable of dissolving completely when made into a 1% by weight solution in the dispersion solvent. The levels of soluble quaternary ammonium compound necessary to the working of the invention vary with the pigments and solvent employed. Typically from about 0.3 to about 30 millimoles of quaternary ammonium group is present per kilogram of pigment. The preferred range for magnetic pigment and nonmagnetic particle dispersions is about 0.5 to about 10 millimoles quaternary ammonium group per kilogram of pigment. Most preferred is about 0.6 to about 3 millimoles quaternary ammonium group per kilogram of pigment.

For many applications it is preferred that the quaternary ammonium compound be polymeric, of number average molecular weight greater than about 500, preferably greater than about 5000, so that it contributes to the mechanical integrity of the coatings of the invention. Low molecular weight quaternary ammonium compounds can be also used to provide acceptable dispersion quality only when used with graft carboxyl polyurethanes. It is required that polymeric quaternary ammonium compounds be used with non-grafted carboxyl polyurethanes, for reasons of dispersion quality.

II(a) Low Molecular Weight Quaternary Ammonium Compounds

Low molecular weight quaternary ammonium compounds have quaternary ammonium functionality and number average molecular weights less than about 500. They give acceptable dispersion rheology when used with the graft carboxyl polyurethanes according to the present invention but are not preferred because they do not contribute positively to finished coatings' properties. For example, tetrabutylammonium chloride can be used.

II(b) Polymeric Quaternary Ammonium Compounds

Polymeric quaternary ammonium compounds have molecular weights of greater than about 500 and are preferred over low molecular weight quaternary ammonium compounds for use with the graft carboxyl polymers of the invention and required for use with non-grafted carboxyl polymers in the invention. Preferred polymeric quaternary ammonium compounds include quaternary ammonium polyols, quaternary ammonium polyurethanes, quaternary ammonium vinyl chloride copolymers and quaternary ammonium non-halogenated vinyl copolymers, and mixtures thereof.

II(b)(1) Quaternary Ammonium Polyethers

Quaternary ammonium polyethers have a polyether chain with pendant quaternary ammonium functionality. Preferred materials include the commercially available Emcol™ CC-9, Emcol™ CC-36, and Emcol™ CC-42, available from Witco Chemical Co. They are composed of polypropylene oxide chains of number average molecular weight 600, 1600 and 2500, respectively, with one quaternary ammonium chloride group per molecule. Other useful quaternary ammonium polyethers are also available from Witco Chemical and other vendors.

II(b)(2) Quaternary Ammonium Polyurethanes

Quaternary ammonium polyurethanes are a preferred class of quaternary ammonium compound because they interact with carboxyl polyurethanes and graft carboxyl polyurethanes to provide excellent dispersion quality while acting as tough co-binders in the magnetic recording media of lie invention.

Quaternary ammonium polyurethanes have at least one quaternary ammonium group pendant from a polyurethane chain of molecular weight greater than about 500. They are formed from the reaction of polyisocyanates and polyols wherein at least one of the polyols is a quaternary ammonium polyol (further described in section II(c)). A macromonomer as defined in section I(a)(ii) may optionally be included in the reaction which forms the quaternary ammonium polyurethane. It is preferred to provide a quaternary ammonium group content in the quaternary ammonium polyurethanes of between 5,000 and 50,000 grams polymer per mole of quaternary ammonium group. The most preferred range of quaternary ammonium group content is 10,000 to 30,000 grams/mole. It is preferred that the quaternary ammonium polyurethanes have a number average molecular weight of approximately 5,000 to 50,000.

A particularly useful type of quaternary ammonium polyurethane can be obtained by reacting a mixture of the quaternary ammonium polyol Emcol™ CC-36 with diols, triols, and a diisocyanate such that the number of moles of triol are greater than or equal to the number of moles of Emcol™ CC-36 and the number of moles of hydroxyl groups in the mixture is greater than the number of moles of isocyanate groups in the mixture. It is to be expected that other quaternary polyurethanes would also work well in the invention.

II(b)(3) Quaternary Ammonium Vinyl Copolymers

Useful quaternary ammonium vinyl copolymers have at least one quaternary ammonium group pendant from a polymer chain formed from polymerized vinyl monomers and have a number average molecular weight of greater than about 500. Polymerization can be carried out by various methods including radical, anionic or cationic, and group transfer polymerization techniques. Quaternary ammonium functional groups can be introduced into the quaternary ammonium vinyl copolymer either through the use of vinyl monomers having quaternary ammonium groups, or by polymer reactions. Vinyl monomers having quaternary ammonium groups include but are not limited to those selected from the group consisting of (meth)acryloyloxyethyl trimethylammonium chloride, (meth)acrylamidopropyl trimethylammonium chloride, (meth)acryloyloxypropyl dimethylbenzylammonium chloride, vinylbenzyl trimethylammonium chloride, N-(3-sulfopropyl)-N-(meth)acryloyloxyethyl-N,N-dimethylammonium betaine, 2-[(meth)acryloyloxy]ethyl trimethylammonium methosulfate, N-(3-sulfopropyl)-N-(meth)acrylamidopropyl-N, N-dimethylammonium betaine, vinylbenzyl trimethylammonium chloride, 2-hydroxy-3-allyloxypropyl trimethylammonium chloride, and mixtures thereof.

An example of a polymer reaction to produce quaternary ammonium vinyl copolymers is the reaction of tertiary amines with epoxy groups pendant from a vinyl copolymer. In order to provide a vinyl copolymer having pendant epoxy groups for this reaction, epoxy functional vinyl monomers may be incorporated into the vinyl copolymer. Such monomers include, for example, glycidyl ether of an unsaturated alcohol such as allyl glycidyl ether, a glycidyl ester such as glycidyl (meth)acrylate, and the like.

We have found that quaternary ammonium vinyl copolymers can be prepared which function effectively in the invention to provide desirable properties of hardness and toughness. In general, it is desired to provide the same level of quaternary ammonium functionality in these polymers as in the quaternary ammonium functional polyurethanes described above.

II(b)(3)(i) Quaternary Ammonium Vinyl Chloride Copolymers

Quaternary ammonium vinyl chloride copolymers can be prepared by various polymerization methods, such as emulsion polymerization, solution polymerization, suspension polymerization, and bulk polymerization. In any of such polymerization methods, incremental or continuous addition of a molecular weight control agent, a polymerization initiator, and the monomers for copolymerization may be used when necessary.

Other types of monomers amenable to copolymerization with vinyl chloride include but are not limited to those selected from the group consisting of various kinds of vinyl esters such as vinyl acetate, vinylidene chloride, acrylonitrile, methacrylonitrile, styrene, acrylate and methacrylate esters such as methyl acrylate, ethyl acrylate, butyl acrylate, and butyl methacrylate and other unsaturated monomers such as vinyl ethers, acrylamide, methacrylamide, maleic anhydride, and mixtures thereof.

Some preferred vinyl chloride copolymer resins are described in U.S. Pat. No. 4,816,683, (assigned to Sekisui Chemical), incorporated by reference herein. These are copolymers of vinyl chloride, hydroxypropyl acrylate, methacryloxyethyl trimethylammonium chloride, and methyacryloxyethyl phosphate. These are thought to be similar to or the same as the commercially available "S-LEC E-C" resins (E-C130 and E-C110) made by Sekisui Chemical Co. According to information supplied by the vendor, these are approximately 84% vinyl chloride, 16% hydroxy acrylic monomer (by weight) and contain a fraction of a percentage of other monomers, including a quaternary ammonium monomer.

II(b)(3)(ii). Quaternary Ammonium Functional Non-Halogenated Vinyl Copolymers

Quaternary ammonium functional polymers prepared by vinyl polymerization which do not employ vinyl chloride or other halogenated vinyl monomers will be termed "quaternary ammonium functional non-halogenated vinyl copolymers" and are useful in the present invention. Of particular utility are the quaternary ammonium functional non-halogenated vinyl copolymers comprising a plurality of pendant nitrile groups, a plurality of pendant hydroxyl groups, an at least one pendant quaternary ammonium salt group, said copolymers having been described in copending U.S. patent application Ser. No. 08/054,312, (assigned to the assignee of the present invention), incorporated by reference herein. Preferred quaternary ammonium functional non-halogenated vinyl copolymers are copolymers of monomers comprising (meth)acrylonitrile; a non-halogenated hydroxyl functional vinyl monomer; a non-halogenated vinyl monomer bearing a quaternary ammonium group; and one or more other non-halogenated vinyl monomers. Representative examples of suitable nonhalogenated hydroxyl functional vinyl monomers include an ester of an α,β-unsaturated carboxylic acid with a diol, e.g., 2-hydroxyethyl (meth)acrylate, or 2-hydroxypropyl (meth)acrylate; 1,3-dihydroxypropyl-2-(meth)acrylate; 2,3-dihydroxypropyl-1-(meth)acrylate; an adduct of an α,β-unsaturated carboxylic acid with caprolactone; an alkanol vinyl ether such as 2-hydroxyethyl vinyl ether; 4-vinylbenzyl alcohol; allyl alcohol; p-methylol styrene; and the like. Preferably, the nonhalogenated, hydroxyl functional, vinyl monomer is selected from 2-hydroxyethyl (meth)acrylate, 2-hydroxypropyl (meth)acrylate, and mixtures thereof. Alternatively, quaternary ammonium functional vinyl copolymers with pendant hydroxyl groups can also be prepared by incorporating vinyl acetate into the vinyl copolymer and then partially or fully hydrolyzing the acetate moieties to produce hydroxyl groups.

Preferred other non-halogenated vinyl monomers include styrene, alkyl-substituted styrenes, alkyl (meth)acrylates wherein the alkyl group contains 1 to 4 carbon atoms, and mixtures thereof. Most preferably, the non-halogenated vinyl monomer is selected from the group consisting of styrene, methyl methacrylate, ethyl methacrylate, and mixtures thereof.

One particularly preferred quaternary ammonium functional non-halogenated vinyl copolymer useful according to the present invention is a copolymer of monomers comprising about 5 to about 40 weight percent of (meth) acrylonitrile; about 30 to about 80 weight percent of a nonhalogenated vinyl monomer; about 1 to about 30 percent by weight of a hydroxy functional vinyl monomer; and about 0.25 to about 10, percent by weight of a nonhalogenated vinyl monomer bearing a quaternary ammonium moiety, based on the total weight of the vinyl copolymer.

II(c) Quaternary Ammonium Polyols

Quaternary ammonium polyols have at least one hydroxyl group and at least one quaternary ammonium group pendant from a polymer chain of number average molecular weight from about 500 to about 5000. Preferred materials include commercially available materials sold by Witco Chemical Co. under the trade designations Emcol™ CC-9, Emcol™ CC-36, and Emcol™ CC-42. These are composed of polypropylene oxide chains of number average molecular weight 600, 1600 and 2500, respectively, and they have one hydroxyl group and one quaternary ammonium chloride group per molecule. Other quaternary ammonium polyols which have hydroxyl groups and acetate or phosphate counterions are also available from Witco Chemical under the Emcol™ tradename and are expected to give similar results. An example of a useful quaternary ammonium diol is methyl-bis(2-hydroxyethyl)-octadecylammonium chloride.

III. Quaternary Ammonium Graft Carboxyl Polyurethanes

It is also preferred in some cases to incorporate a quaternary ammonium group into a graft carboxyl polyurethane. When a quaternary ammonium group is incorporated into a graft carboxyl polyurethane, blending with an additional quaternary ammonium compound becomes optional.

One way that quaternary ammonium graft carboxyl polyurethanes can be prepared is by combining a macromonomer diol, a quaternary ammonium polyol (such as Emcol™ CC-36), a carboxylic acid diol, and optionally other polyols with a diisocyanate at an isocyanate/hydroxyl ratio of 1:1 or less and causing them to react so that all of the isocyanate is consumed. This effectively replaces some or all of the hydroxyl termini of the graft carboxyl polyurethane or the carboxyl polyurethane with quaternary ammonium termini. The quaternary ammonium group equivalent weight is preferably 2,000–100,000; it is most preferably 10,000 to 50,000.

IV. Additional Polymers

The dispersions and coatings of the invention may optionally further comprise additional polymers (different from those present in the dispersions and coatings) which are preferably soluble in the dispersion solvent.

Examples of useful additional polymers include but are not limited to those selected from the group consisting of polyurethanes, polyesters, vinyl copolymers, and vinyl chloride copolymers.

V. Curatives

Curatives may be added to the dispersions of the invention in order to provide crosslinking of the coatings formed when the dispersions are coated and dried. This improves such properties as debris generation and durability in magnetic recording media coatings. It also imparts solvent resistance.

Useful curative types include polyisocyanate curatives, toughened polyisocyanate curatives, and radiation curatives. Exceptional properties result from the use of preferred toughened polyisocyanate curatives in the dispersion and coatings of the invention. Curatives are typically added to dispersions after milling of the dispersion and just before coating.

V(a). Polyisocyanate Curatives

Typical polyisocyanate curatives known to the magnetic recording media art cure to a glass transition temperature of greater than about 100° C. and may be used according to this invention to produce coatings of high glass transition temperature and hardness. A preferred type is the reaction product of an excess of a diisocyanate with low number average molecular weight (under about 200) diols and triols. A typical and widely used curative comprises, for example the adduct of toluene diisocyanate with a mixture of trimethylol propane and a diol such as butane diol or diethylene glycol. A preferred material of this type is available under the trade designation MONDUR™ CB-55N from Bayer Corporation. Other useful high Tg curatives are available under the trade designations MONDUR™ CB-601, MONDUR™ CB-701, MONDUR™ MRS, and DESMODUR™ L (all available from Bayer Corporation and CORONATE L (available from Nippon Polyurethane). Additional isocyanate curing agents are described in U.S. Pat. No. 4,731,292, incorporated by reference herein.

V(b) Toughened Polyisocyanate Curatives

As noted previously, it is possible to incorporate high levels of curative (greater than about 20% based on the total weight of the formulation solids exclusive of pigment) into the dispersions and coatings of the invention in order to increase their performance. However, commonly used isocyanate curatives are of the type described in V(a), which contain no toughening segments and may create a brittle coating when used at high levels.

It is preferable to provide a toughened polyisocyanate curing agent which cures to a tough and flexible, rather than a brittle, film. Useful toughened polyisocyanate curatives are obtained as the reaction product of an excess of a polyisocyanate with polyols, including 10–80% by weight of an oligomeric polyol which acts as a toughening segment. The oligomeric polyols useful in making toughened polyisocyanate curatives have a number average molecular weight of about 500 to about 5000 and a glass transition temperature of lower than about 0° C., preferably lower than about minus 20° C. The oligomeric polyols are preferably selected from the group consisting of a polyester diols, polyester triols, polyether diols, polyether triols, polycarbonate diols, polycarbonate triols, and mixtures thereof.

One of the preferred toughened polyisocyanate curatives is made from the reaction product of CB-55N (described above), with 45 weight percent of a polycaprolactone diol of 1300 number average molecular weight. This modification of CB-55N provides a faster cure and a tougher coating. It is preferred in formulations in the dispersions and coatings of the invention to use between about 20 and about 60 weight percent, most preferably about 30 to about 50 weight percent of the toughened polyisocyanate curative based upon the weight of formulation solids exclusive of pigments.

V(c) Radiation Curing

Optionally, ethylenically-unsaturated compounds which are crosslinkable when subjected to ionizing radiation may be present in the dispersions and coatings of the invention. Examples of such materials include pentaerythritol tetra(meth)acrylate, trimethylolpropane tri(meth)acrylate, urethane (meth)acrylates, and the like.

When ionizing radiation is used as a curing method, it is preferred that ethylenically-unsaturated groups also be pendant from the backbone of the graft carboxyl polyurethane and/or the carboxyl polyurethane and/or the quaternary ammonium compound (if present). Such pendant ethylenically-unsaturated groups may be obtained by the introduction of one or more ethylenically unsaturated diols into polyurethane polymerization reaction mixture (for example as "optional polyols" in the graft carboxyl polyurethane) or by chemical reaction of at least one unsaturated compound which further contains a functional group which is reactive with one or more hydroxyl groups pendant from the polyurethane backbone.

Copolymerizable ethylenically unsaturated diols include 3-allyloxy-1,2-propanediol, 3-methacryloxy-1,2-propanediol, pentaerythritol diacrylate, and the like. Useful hydroxyl-reactive functional groups include, for example, isocyanate groups, acid chloride groups, and anhydride groups. Useful functional-group containing unsaturated compounds include but are not limited to those selected from the group consisting of isocyanatoethyl methacrylate, allyl isocyanate, alpha, alpha-dimethyl-m-isopropenyl benzylisocyanate, (meth)acryloyl chloride, itaconic anhydride, toluene diisocyanate-hydroxyalkyl (meth)acrylate adducts, and mixtures thereof. The backbone may have one or more pendant ethylenically unsaturated groups, typically a plurality thereof.

VI Curing Adjuvants

Various adjuvants can be used with polyisocyanate curatives to give a faster or more complete cure. These include catalysts such as tertiary amines or organometallic compounds. They also include cure enhancers which release highly reactive species upon exposure to moisture such as ketimines, aldimines and oxazolidines.

A useful class of compounds for this purpose is the ketimines. Useful ketimines are the reaction (dehydration) products of diamines with ketones. These protected amino compounds show good pot life in anhydrous conditions in the presence of isocyanates but hydrolyze quickly with water to regenerate diamines, which are highly reactive towards isocyanates. Specific ketimines and formulas are described in copending U.S. patent application Ser. No. 08/495,942, filed Jun. 28, 1995, assigned to the assignee of the present invention, and incorporated by reference herein. A preferred method is to combine a modified polyisocyanate as described in section V(b) with a ketimine which is prepared by dehydration of a reaction mixture of Ethacure™ 100 (available from Ethyl Corporation), cyclohexanone and catalyst.

VII. Dispersions

The materials described herein can be used to prepare magnetic media such as tapes, e.g., video tapes, computer tape and data cartridge tape, and diskettes, both single-sided and double-sided.

Magnetizable and/or non-magnetic pigments can be readily dispersed using the technology of the invention. The preparation of a pigment dispersion using the technology of the present invention is relatively straight-forward; for example, well known mixing and milling methods such as ball milling or sand milling can be employed.

A variety of pigments can be used including but not limited to those selected from the group consisting of magnetizable pigments, carbon black, titanium dioxide, and alumina. A variety of magnetizable pigments may be used in preparing magnetic recording media, including but not limited to those selected from the group consisting of ferric oxides; gamma ferric oxide; cobalt doped gamma ferric oxides; chromium dioxide; iron; iron-cobalt; cobalt; nickel; cobalt-nickel; cobalt-phosphorus; barium ferrite; and mixtures thereof. Mixtures of magnetic and non-magnetic pigment are also useful in preparing magnetic recording media.

It is foreseen that a variety of loadings, densities, solvent systems, adjuvants, etc., may be utilized.

The coated and dried dispersion of the present invention can be readily cured using one or more of the curatives described previously. A curative is typically added after the other components in the dispersion are combined and milled together. The curative is preferably added in a proportion of about 1 to 60 weight percent based upon the binder weight, preferably 10 to 50 weight percent, based upon the weight of formulation solids exclusive of pigment.

The resulting dispersion can be readily applied to a support such as a polyethylene terephthalate (PET) film using any of a number of coating techniques including knife coating and gravure coating. Examples of supports on which the magnetic coating material can be applied include but are not limited to those selected from the group consisting of polyesters such as polyethylene terephthalate and polyethylene-2,6-naphthalate; polyolefins such as polyethylene and polypropylene; derivatives of cellulose such as cellulose triacetate, cellulose acetate butyrate, cellulose acetate propionate; polycarbonate; polyvinyl chloride; polyimides; polyamides; metals such as aluminum and copper; and paper. Immediately after coating and while the solvent is still present and the binder is substantially uncured, the coated substrate typically is subject to a magnetic field to orient the magnetic particles. After coating and orienting, the coated material is dried of solvent and then optionally calendered. The drying and curing retains the pigment in the oriented manner. Curing can take place either at room temperature or at elevated temperatures (50–60° C.).

Another method of cure involves irradiation of a polymeric binder containing radiation-curable moieties such as ethylenically-unsaturated groups. Irradiation of the coated and dried dispersion may be achieved using any type of ionizing radiation, e.g., electron beam radiation or ultraviolet radiation, in accordance with practices known in the art. Preferably, curing is achieved with an amount of electron beam radiation in the range of from about 1 to about 20 Mrads, preferably from about 4 to about 12 Mrads, and more preferably from about 5 to about 10 Mrads of electron beam radiation having an energy level in the range of from about 100 to about 400 keV, preferably from about 200 to about 250 keV. Although electron beam irradiation can occur under ambient conditions or in an inert atmosphere, it is preferred to use an inert atmosphere as a safety measure in order to keep ozone levels to a minimum and to increase the efficiency of curing. "Inert atmosphere" means an atmosphere comprising flue gas, nitrogen, or a noble gas and having an oxygen content of less than 500 parts per million (ppm). A preferred inert atmosphere is a nitrogen atmosphere having an oxygen content of less than about 75 ppm.

A variety of additives known to those skilled in the art can be incorporated into the dispersions and coatings of the invention. The dispersions and coatings can further comprise additives including but not limited to those selected from the group consisting of head-cleaning agents, lubricants, carbon black, dispersants, and wetting agents. It is envisioned that lubricants such as those disclosed in U.S. Pat. Nos. 4,731,292 and 4,784,907, both incorporated by reference herein, could be added to obtain desired frictional and processing characteristics. Examples of useful lubricants include but are not limited to those selected from the group consisting of $C_{10}$ to $C_{22}$ fatty acids, $C_1$ to $C_{18}$ alkyl esters of fatty acids, and mixtures thereof. Other examples of useful lubricants include those selected from the group consisting of silicone compounds such as silicone oils, fluorochemical lubricants, fluorosilicones, and particulate lubricants such as powders of inorganic or plastic materials. Preferred lubricants include those selected from the group consisting of myristic acid, stearic acid, palmitic acid, and butyl and amyl esters thereof. Typically mixtures of lubricants are used, especially mixtures of fatty acids and fatty esters.

The dispersion may further comprise about 1 to about 10 weight percent of a wetting agent based upon the weight of the pigment. Suitable wetting agents include but are not limited to those selected from the group consisting of phosphoric acid esters such as mono-phosphorylated propylene oxide adducts of glycerol, e.g., the reaction product of 1 mole of phosphorous oxychloride with the reaction product of 10–11 moles of propylene oxide and 1 mole of glycerine.

Examples of useful head cleaning agents include but are not limited to those disclosed in U.S. Pat. Nos. 4,784,914 and 4,731,292, both incorporated by reference herein. Examples of such head cleaning agents include but are not limited to those selected from the group consisting of alumina, chromium dioxide, alpha iron oxide, and titanium dioxide particles of a size less than about 2 microns which have a Mohs hardness of greater than about 5 and which are added in an amount ranging from about 0.2 to about 20 parts per hundred parts of magnetic pigment.

If the binder described herein is used as a back-coat for magnetic media, the back-coat can optionally further comprise non-magnetizable pigments, such as, for example, those selected from the group consisting of carbon black, graphite, aluminum oxide, titanium dioxide, zinc oxide, silica gel, calcium carbonate, barium sulfate, and mixtures thereof.

In the following examples, the following agents were used:

TONE™ 0230—a polycaprolactone diol from Union Carbide, molecular weight about 1300.

TONE™ 0210—a polycaprolactone diol from Union Carbide, molecular weight about 850.

TONE™ 0301—a polycaprolactone triol from Union Carbide, molecular weight about 297.

TONE™ 0305—a polycaprolactone triol from Union Carbide, molecular weight about 540.

DBTDL—dibutytin dilaurate.

DMPA—dimethanol propionic acid, 2,2-bis (hydroxymethyl)propionic acid.

MDI—diphenylmethane diisocyanate

MEK—methylethyl ketone

HN-6—a styrene/acrylonitrile macromonomer diol having a molecular weight of about 6000 from Toagosei Chemical Co., LTD.

Emcol™ CC-36—a quaternary ammonium polyether of the formula $H-(OCHCH_3CH_2-)_n N'R_1R_2R_3X^-$ wherein $R_1$, $R_2$, are ethyl, $R_3$ is methyl and $X^-$ is $Cl^-$ and n=25. from Witco Chemical Co.

Dowa HM-77—an iron metal magnetic particle from Dowa Mining Co., Ltd.

Toda B3—an iron metal magnetic particle from Toda Kogyo Corporation.

Toda D1—an iron metal magnetic particle from Toda Kogyo Corporation.

Ravecarb™ 106—a polycarbonate diol, molecular weight about 2000, from Enichem America, Inc.

Estane™ 5703—a polyurethane from B F Goodrich Co.

Lexorez™ 1405-65—a polyester polyol produced by Inolex Chemical Company. The typical properties of Lexorez™ 1405-65 include: hydroxyl equivalent weight 850, acid equivalent weight 1100.

UR8300—a sulfonate functional polyurethane from Toyobo Chemical Co., Ltd.

TI7503—a carboxyl functional polyurethane from Sanyo Chemical Co., Ltd.

MR113—a sulfonate functional vinyl chloride copolymer from Nippon Zeon Co., Ltd.

E-C130—a quaternary ammonium functional vinyl chloride copolymer from Sekisui Chemical Co., Ltd.

Definition of Terms

Equivalent Weight

The term equivalent weight, as used herein with respect to a functionality or moiety, refers to the mass of polymer per mole, or equivalent, of functionality.

Inherent Viscosity

The inherent viscosity of each composition was measured to provide a comparison of the molecular weight of each composition. The inherent viscosity was measured by conventional means using a Wescan #50 viscometer in a water bath controlled at 25° C. to measure the flow time of 10 milliliters of a polymer solution (0.8 grams per deciliter of polymer in tetrahydrofuran solvent) and the flow time of the solvent. In each experiment, inherent viscosity is reported in deciliters per gram.

Rodenstock

Rodenstock value is a measure of smoothness of a coating and was measured using a RODENSTOCK RM-400 surface finish analyzer commercially available from Rodenstock Co. Generally, a lower Rodenstock value corresponds to a smoother surface.

Gloss

Gloss refers to the percentage of light incoming at 45° measured via a Pacific Scientific Glossgard II 45° glossometer Gn Gn is a dimensionless measure of coercivity distribution measured by an MH meter or a VSM meter and given by the expression:

$$Gn=(Hc)/(DHc)$$

where DHc is the width of the coercivity range at ½ peak height. Gn is the reciprocal of the switching field distribution.

Pigment Loading

Pigment loading is the ratio of pigment weight to the total weight of a dried coating.

Rheology

Rheology refers to a qualitative description as to the fluidity of a dispersion.

EXAMPLES

The detailed description includes exemplary preparations of the polymer and polymer dispersions and coatings in accordance with the invention and magnetic recording media prepared therefrom. All parts, percentages, ratios, etc., throughout the Specification, including the Examples, are by weight unless otherwise indicated.

I. Macromonomer and Polymer Preparation

Examples 1–20 and Comparative Examples 1–2

Example 1

Preparation of a Graft Carboxyl Polyurethane Having 25% Graft Segments

In a 500 ml flask, 25 g (0.01 equivalent) of HN-6 macromonomer and 26.6 grams (0.397 equivalents) of 2,2-bis(hydroxymethyl)propionic acid were dissolved in 200 g MEK solvent. The solution was then dried via azeotropic distillation of 50 g of MEK. To this solution, 48.4 g of MDI and 2 drops (~50 mg) of DBTDL catalyst were added. The solution was then heated 8 hours at reflux whereupon the reaction was complete according to infrared analysis. This polymer contains 25% HN-6 by weight and has a calculated carboxyl content of 2 meq/g.

Example 2

Preparation of a Graft Carboxyl Polyurethane Having 50% Graft Segments

In a 5 liter reaction vessel, 802.3 g (0.32 equivalents) of HN-6 macromonomer and 276.4 g (4.12 equivalents) DMPA were dissolved in 2396 g MEK solvent. The solution was then dried by azeotropic distillation of 650 g of MEK. To this solution, 525.95 g (4.21 equivalents) of MDI and 3 drops (~90 mg) of DBTDL catalyst were then added. The solution was then heated 8 hours at reflux whereupon the amount of unreacted isocyanate was not detectable by infrared analysis. This polymer contains 50% HN-6 by weight and has a calculated carboxyl content of 1.3 meq/g.

Example 3

Preparation of a Graft Carboxyl Polyurethane Having 75% Graft Segments

In a 5 liter reaction vessel, 900 g (0.36 equivalents) of HN-6 macromonomer and 92.79 g (1.38 equivalents) DMPA were dissolved in 2400 g MEK solvent. The solution was then dried by an azeotropic distillation; 600 g of MEK were removed by distillation, followed by addition of 600 g of dry MEK. Then another 600 g of MEK was removed by distillation. To this dried solution, 207.21 g (1.65 equivalents) of MDI and 4 drops (~120 mg) of DBTDL catalyst were added. The solution was heated at reflux for 24 hours until the amount of unreacted isocyanate was not detectable by infrared analysis. This polymer contains 75% HN-6 by weight and has a calculated carboxyl content of 0.6 meq/g.

Example 4

Preparation of a Graft Carboxyl Polyurethane Having 70% Graft Segments

In a 5 liter reaction vessel was placed a 50.9% solution of HN-6 macromonomer in MEK solvent (1500 g), 2,2-bis (hydroxymethyl)propionic acid (64.56 g), TONE™ 0305 (87.26 g), and MEK solvent (1400 g). The solution was dried by an azeotrope distillation; 500 g of MEK were removed by distillation, followed by addition of 500 g of dry MEK. Then another 500 g of MEK was removed by distillation. After the azeotrope distillation, 175.4 g of MDI and 3 drops of dibutyltin dilaurate catalyst were added. The solution was heated at about 75° C. until the isocyanate peak was not detectable in the IR spectrum. About 24 hours of heating was sufficient time to complete the reaction.

Example 5
Preparation of a Carboxyl Polyurethane

In a 5 liter reaction vessel, 432.84 g (6.46 equivalents) DMPA, 767.16 g (6.14 equivalents) MDI and 4 drops (~120 mg) DBTDL catalyst were dissolved in 1800 g MEK. The solution was heated at reflux for about 5 hours until no unreacted isocyanate was detectable by infrared analysis. The acid content of this polymer was calculated to be 2.7 meq/g.

Example 6
Preparation of a Carboxyl Polyurethane

In a 5 liter reaction vessel, 201.9 g (3.01 equivalents) DMPA, 458.1 g (3.66 equivalents) MDI, 540.0 g (3.00 equivalents) of TONE™ 230 and 3 drops (~90 mg) DBTDL catalyst were dissolved in 1800 g MEK. The solution was heated at reflux for 10 hours whereupon no unreacted isocyanate was detectable by infrared analysis. The acid content of this polymer was calculated to be 1.3 meq/g.

Example 7
Preparation of a Graft Carboxyl Polyurethane Containing a Polylactone Macromonomer The following materials were charged to a 250 milliliter three neck round bottom flask: 2,2-Bis(hydroxymethyl) propionic acid (6.6 g; 0.099 equivalents), Example # 9, (39.3 g; 0.013 equivalents), TONE™ 0305 (9.5 g; 0.053 equivalents) and 117 g methylethyl ketone. Diphenylmethane diisocyanate (140.63 g; 1.125 equivalents) and 4 drops of dibutyltin dilaurate were added to the reaction mixture. The reaction was heated under reflux (18 hours) until there was no free isocyanate observed in the infrared spectrum. The material had an inherent viscosity of 0.37 dl/g when measured in tetrahydrofuran. The calculated acid content is 0.66 meq/g for this product.

Example 8
Preparation of a Graft Carboxyl Polyurethane Containing Two Types of Macromonomer Segments The following materials were charged to a two liter three neck round bottom flask: HN-6 macromonomer (137.5 g; 0.055 equivalents), 2,2-bis(hydroxymethyl)propionic acid (51.7 g; 0.772 equivalents), polylactone macromonomer from Example #9 (163.1 g; 0.054 equivalents), TONE™ 0305 (.57.1 g; 0.317 equivalents), and 1156.7 g methylethyl ketone. A total of 568.8 g methylethyl ketone was distilled to achieve a water content of <500 ppm. Diphenylmethane diisocyanate (140.63 g; 1.125 equivalents), 236.84 g dry methylethyl ketone and 4 drops of dibutyl tin dilaurate were added to the reaction mixture. The reaction was heated under reflux (18 hours) until there was no free isocyanate observed in the infrared spectrum. The material had an inherent viscosity of 0.35 dl/g when measured in tetrahydrofuran. The calculated acid content was 0.7 meq/g.

Example 9
Preparation of a Polylactone Macromonomer

ϵ-Caprolactone (3242.74 g; 28.445 equivalents) from Aldrich Chemical Co. and n-octanol (147.26 g; 1.130 equivalents) were added to a five liter resin flask and degassed using vacuum and nitrogen. Tetrabutyl titanate (0.20%; 6.78 g) was added and the reaction was heated at 160° C. for two hours. The reaction was cooled to 145° C. while pulling vacuum down to 1–5 mm Hg. The reaction was held at 150–155° C. for one hour. Nitrogen was used to break vacuum and the material was transferred to a sample container. 3384.8 g (99.85% yield) of a product was obtained which had a hydroxyl equivalent weight of 3000 g/eq.

Example 10
Preparation of a Quaternary Ammonium Polyurethane

Ravecarb™ 106 (1009.4 g, 1.009 equivalents), 1,4-cyclohexanedimethanol (625.9 g, 8.129 equivalents), Emcol™ CC-36 (288.0 grams, 0.180 equivalents) and methylethyl ketone (3300 g) were charged to the 12 liter reaction vessel. Methylethyl ketone (1155 g) was distilled to achieve a water content of <500 ppm. Isophorone diisocyanate (1294.33 g 11.648 equivalents) and 0.02% dibutyltin dilaurate were charged to the reaction vessel. The reaction was maintained under reflux for 18–24 hours. The reaction was determined to be complete when no hydroxyl was observed in the infrared spectrum. Theoretical isocyanate equivalent weight at this point was 1381.

TONE™ 0301 (322.56 g, 3.584 equivalents) and methylethyl ketone (215 g) were charged to the prepolymer solution and the reaction was maintained under reflux. After 90 minutes, additional methylethyl ketone (2950 g) was added and the reaction was maintained under reflux until there was no free isocyanate observed in the infrared spectrum (36–48 hours). The product had an inherent viscosity of 0.33 dl/g in tetrahydrofuran. The calculated quaternary ammonium content was 0.05 meq/g.

Example 11
Preparation of a Non-halogenated Quaternary Ammonium Vinyl Copolymer

Styrene (161.25 g), acrylonitrile (50.0 g), hydroxypropyl acrylate (37.5 g), methyacryloyloxyethyl trimethylammonium chloride (1.25 g), 3-mercapto-1,2-propanediol (0.5 g), methylethyl ketone (375 g) and azobisisobutyronitrile (1.25 g) were charged into a liter amber reaction bottle. The resultant admixture, which contained some undissolved methacryloyl-oxyethyl trimethyl ammonium chloride, was purged with $N_2$ for 7 minutes at 1 liter per minute, after which the bottle was sealed. The sealed bottle and its contents were tumbled in a constant temperature bath, at 65° C. to 70° C. for 80 hours. The product was a clear, homogeneous solution. The inherent viscosity in methylethyl ketone was 0.30 dl/g.

Example 12
Preparation of a Non-halogenated Quaternary Ammonium Vinyl Copolymer 3.0 grams of methacryloyloxyethyl trimethyl ammonium chloride (QMA) was predissolved in 7.5 grams of hydroxypropyl acrylate (IIPA) in a 100 ml wide mouth jar by rolling the jar containing the two components on a rubber roller.

In a one-liter amber reaction bottle were charged the above premix of QMA and IIPA, 217 g styrene (St), 72.3 g acrylonitrile (AN), 0.6 g mercaptopropane diol (MPD), 1.8 g 2,2'-azobisisobutyronitrile and 338 g methylethyl ketone (MEK). The resulting clear solution was purged with nitrogen for 5 minutes at 1 LPM (liter per minute) after that the bottle was sealed and tumbled in a constant temperature bath at 65° C. for 48 hrs. The product obtained was a clear homogeneous solution with inherent viscosity of 0.31 dl/g and 950 cps Brookfield viscosity.

Example 13
Preparation of a Polyisocyanate Curative

To a 12 liter flask was added 2440 grams (3.813 equivalents) TONE™ 0230 caprolactone diol from Union Carbide Corporation, 5053 grams (11.44 equivalents) of CB55N from Bayer, 0.2 grams of dibutyltin dilaurate catalyst and 2945 grams MEK. The reaction was held at 75° C. for 2 hours until no hydroxyl groups were detectable by infrared spectroscopy. The material had a calculated isocyanate equivalent weight of 685, a calculated molecular weight of 2740 and a calculated functionality of 4.0. The percent solids were 50% in MEK.

Example 14
Preparation of a Graft Carboxyl Polyurethane from a Carboxylic Acid Functional Polyester Polyol HN-6 macromonomer (140.0 g; 0.056 equivalents) diluted with 444.3 g methylethyl ketone was added to a one liter 3 neck round bottom flask containing Lexorez™ 1405-65 (116.5 g; 0.147 equivalents). An additional 132 g methylethyl ketone was added to the flask. A total of 482.6 g methylethyl ketone was distilled and replaced with 330.8 g dry methylethyl ketone to achieve a water content of <500 ppm. Diphenylmethane diisocyanate (23.85 g; 0.191 equivalents) and 3 drops of dibutyltin dilaurate were added and the reaction was heated to reflux. The reaction was maintained at reflux (18–24 hours) until no free isocyanate was observed in the infrared spectrum. The product had an inherent viscosity of 0.19 dl/g in tetrahydrofuran. An additional 1.33 g diphenylmethane diisocyanate (0.0106 equivalents) was added and reacted to completion. The final product had an inherent viscosity of 0.22 dl/g when measured in tetrahydrofuran. The calculated acid content of this material was 0.33 meq/g. The $T_g$ of this polymer was determined to be +3.5° C. by differential scanning calorimetry.

Example 15
Preparation of a Graft Carboxyl Polyurethane Having Quaternary Ammonium Functionality.

HN-6 macromonomer (55.0 g; 0.022 equivalents), Emcol™ CC-36 (17.6 g; 0.11 equivalents), n-butanol (0.8 g; 0.11 equivalents), and 252.7 g methylethyl ketone were charged to a 500 ml three neck round bottom flask which had been inerted with nitrogen. A total of 127 g methylethyl ketone was distilled and replaced with 32.3 g dry methylethyl ketone to achieve a water content of <500 ppm. The reaction was cooled and the following materials were added: 2,2-bis(hydroxymethyl)propionic acid (7.4 g; 0.110 equivalents), diphenylmethane diisocyanate (19.2 g; 0.154 equivalents) and 3 drops of dibutyltin dilaurate. The reaction was maintained under reflux until there was no free isocyanate observed in the infrared spectrum, The acid content was calculated to be 0.055 meq/g. The quaternary ammonium group content was calculated to be 0.10 meq/g.

Example 16
Preparation of a Graft Carboxyl Polyurethane Having Quaternary Ammonium Functionality HN-6 macromonomer (60.0 g; 0.024 equivalents), Emcol™ CC-36 (9.6 g; 0.006 equivalents), n-butanol (1.3 g; 0.018 equivalents), and 253 g methylethyl ketone were charged to a 500 milliliter three neck round bottom flask which had been inerted with nitrogen. A total of 92 g methylethyl ketone was distilled to achieve a water content of <500 ppm. The reaction was cooled and the following materials were added: 2,2-bis(hydroxymethyl)propionic acid (8.0 g; 0.120 equivalents), diphenylmethane diisocyanate (21.0 g; 0.168 equivalents), and 3 drops of dibutyltin dilaurate. The reaction was heated under reflux (16 hours) and judged complete when there was no free isocyanate observed in the infrared spectrum. The acid content is calculated to be 0.055 meq/g. The quaternary ammonium group content was calculated to be 0.06 meq/g.

Example 17
Preparation of a Carboxyl Polyurethane from a Carboxylic Acid Functional Polyester Polyol Lexorez™ 1405-65 (306.38 g; 0.388 equivalents) and 528.6 g methylethyl ketone were charged to a one liter three neck round bottom flask which had been inerted with nitrogen. Methylethyl ketone, (490 g) was distilled and 462 g dry methylethyl ketone was added to achieve a water content of <500 ppm. Diphenylmethane diisocyanate (43.62 g; 0.349 equivalents) and 3 drops of dibutyltin dilaurate were added to the flask. The reaction was heated under reflux 14–18 hours until no free isocyanate was observed in the infrared spectrum. An additional 4.33 g of diphenylmethane diisocyanate was added and reacted to completion. The final product had an inherent viscosity of 0.32 dl/g. The calculated acid content of this material was 0.7 meq/g.

Example 18
Preparation of a Quaternary Ammonium Polyurethane Having Graft Segments Ravecarb™ 106 (1084.5 g; 1.085 equivalents), HN-6 macromonomer (900.0 g; 0.360 equivalents), 1,4-cyclohexanedimethanol (268.1 g; 3.482 equivalents), Emcol™ CC-36 (288.0 grams; 0.180 equivalents) and methylethyl ketone (3400 g) were charged a the 12 liter reaction vessel. Methylethyl ketone (1196 g) was distilled to achieve a water content of <500 ppm. Isophorone diisocyanate (766.05 g; 6.894 equivalents) and 0.02% dibutyltin dilaurate were charged to the reaction vessel. The reaction was maintained under reflux for 12–18 hours. The reaction was determined to be complete when no hydroxyl was observed in the infrared spectrum. Theoretical isocyanate equivalent weight was 1850 g/eq.

TONE™ 0301 (247.47 g, 2.750 equivalents) and 166 g methylethyl ketone were added to this prepolymer solution. The reaction was maintained under reflux for 90 minutes then diluted with 2950 g methylethyl ketone. The reaction was maintained under reflux until there was no free isocyanate observed in the infrared spectrum (36–48 hours). The product had an inherent viscosity of 0.30 dl/g in tetrahydrofuran. An additional 6.35 g isophorone diisocyanate was added along with 1.88 g 1,4-diazobicyclo[2.2.2]-octane from Aldrich Chemical Company and reacted to completion. The final product had an inherent viscosity of 0.42 in tetrahydrofuran. The calculated ammonium salt content was 0.05 meq/g.

Example 19
Large Scale Preparation of a Graft Carboxyl Polyurethane Having 70% Graft Segments In 300 liter reaction vessel, 12.7 kg (5.08 equivalents) of HN-6 macromonomer, 1.45 kg (8.06 equivalents) of TONE™ 305 triol and 1.08 kg 16.12 equivalents) of DMPA were dissolved in 600 g MEK solvent. The solution was dried via an azeotropic distillation, whereupon 2.92 kg 23.36 equivalents) of MDI and 7 g of DBTDL catalyst were added. The solution was then heated 8 hours at reflux until the amount of unreacted isocyanate was not detectable by infrared analysis. This polymer contained 70% HN-6 by weight and had a calculated carboxyl content of 0.4 meq/g.

Example 20
Large Scale Preparation of a Quaternary Ammonium Polyurethane

Ravecarb™ 106 (19.07 kg; 19.07 equivalents), 1,4-cyclohexanedimethanol (11.85 kg; 153.9 equivalents), Emcol™ CC-36 (5.45 kg; 3.4 equivalents) and methylethyl ketone (52 kg) were charged to the 200 liter kettle. Methylethyl ketone (11.4 kg) was distilled to achieve a water content of <500 ppm. Isophorone diisocyanate (24.5 kg; 220.9 equivalents) and dibutyltin dilaurate (250 g) were charged to the reaction vessel. The reaction was heated to 100° C. for 3 hours. The reaction was determined to be complete when no hydroxyl was observed in the infrared spectrum. TONE™ 0301 (6.1 kg; 67.6 equivalents) and methylethyl ketone (4.0 kg) was added to the prepolymer and heated to 100° C. and held for 90 minutes. Additional methylethyl ketone (55.8 kg) was added to the batch after the 90 minute hold. The reaction was sampled at 3 hour increments until there was no isocyanate peak in the infrared spectrum.

Comparative Example 1
Preparation of a Mercaptosuccinic Acid Functional Polyurethane Having a Carboxyl Content of 0.05 meq/g.

To a 100 liter kettle were added 7.5 kg TONE™ 0210 (17.7 eq) polycaprolactone diol from Union Carbide Corporation, 1.9 kg neopentyl glycol (36.7 eq), and 27 kg MEK. Then 10.2 g dibutyltin dilaurate, and 8.9 kg MDI (71.2 eq) were added. The mixture was heated at 80 degrees Celsius for 2 hours. Then 195.8 g mercaptosuccinic acid (1.5 eq), 6.6 kg TONE™ 0305 polycaprolactone triol (36.7 eq), and 9 kg MEK were added. The reaction mixture was heated at reflux for 3 hours. An additional charge of 590 g MDI (4.72 eq), was added and held at reflux for 3 hours. Final inherent viscosity in tetrahydrofuran was 0.28 dl/g. Calculated mercaptosuccinic acid content was 0.05 meq/g.

Comparative Example 2
Preparation of a Mercaptosuccinic Acid Functional Polyurethane Having a Carboxyl Content of 0.05 meq/g and Graft Segments.

To a 2 liter reactor were added 129 g (0.3 equivalents) TONE™ 0210, 29.3 g (0.65 equivalents) neopentyl glycol, 150 g (0.06 equivalents) HN-6 macromonomer, 2 drops dibutyltin dilaurate, and 710 g MEK. The mixture was dried by azeotropic distillation until the water content was less than about 500 ppm. After 160.5 g (1.28 equivalents) MDI was added, the mixture was heated at reflux for 1 hour, whereupon 4.5 g (0.03 equivalents) mercaptosuccinic acid was added. Then, 118 g (0.65 equivalents) TONE™ 0305 polycaprolactone triol and an additional 178 g MEK were added. Heating at reflux was resumed for an additional 2 hours, after which infrared spectroscopic analysis showed that all of the anhydride and all of the isocyanate had been consumed. An additional 23.3 g (0.19 equivalents) MDI was added and the mixture was heated at reflux for an additional hour. The product showed an inherent viscosity in tetrahydrofuran of 0.28 dl/g. The mercaptosuccinic acid (carboxylic acid) content of the resulting polyurethane was calculated to be 0.05 meq/g.

TABLE I

Summary of Polymers

| Example | Type | Acid (meq/g) | % Macromonomer |
|---|---|---|---|
| Ex. 1 | Graft carboxyl polyurethane | 2 | 25 |
| Ex. 2 | Graft carboxyl polyurethane | 1.3 | 50 |
| Ex. 3 | Graft carboxyl polyurethane | 0.6 | 75 |
| Ex. 4 | Graft carboxyl polyurethane | 0.4 | 70 |
| Ex. 5 | Non-grafted carboxyl polyurethane | 2.7 | 0 |
| Ex. 6 | Non-grafted carboxyl polyurethane | 1.2 | 0 |
| Ex. 7 | Graft carboxyl polyurethane | 0.7 | 65 |
| Ex. 8 | Graft carboxyl polyurethane | 0.7 | 65 |
| Ex. 9 | Polylactone macromonomer | 0 | 100 |
| Ex. 10 | Quaternary ammonium polyurethane | 0 | 0 |
| Ex. 11 | Quaternary ammonium vinyl copolymer | 0 | 0 |
| Ex. 12 | Quaternary ammonium vinyl copolymer | 0 | 0 |
| Ex. 13 | Curative | 0 | 0 |
| Ex. 14 | Graft carboxyl polyurethane | 0.3 | 50 |
| Ex. 15 | Quaternary ammonium graft carboxyl polyurethane | 0.5 | 55 |
| Ex. 16 | Quaternary ammonium graft carboxyl polyurethane | 0.6 | 60 |
| Ex. 17 | Non-grafted carboxyl polyurethane | 0.7 | 0 |
| Ex. 18 | Quaternary ammonium polyurethane | 0 | 25 |
| Ex. 19 | Graft carboxyl polyurethane | 0.4 | 70 |
| Ex. 20 | Quaternary ammonium polyurethane | 0 | 0 |
| Comp. 1 | Low carboxyl content polyurethane | 0.05 | 0 |
| Comp. 2 | Low carboxyl content grafted polyurethane | 0.05 | 25 |

II. Preparation of Dispersions and Coatings

Examples 21–47 and Comparative Examples 3–10

To a steel milling container, 10 to 15 g of metal pigment, a quantity of polymer solids based upon the pigment loading and polymer ratios shown in Tables II and III, and enough solvent (MEK/tolulene at an 80/20 weight ratio) to bring the overall amount of solids to 40% were added. Approximately 190 grams of steel milling media was added and the mix was milled for 2 hours on a Red Devil Shaker. After 2 hours of milling, enough solvent (80/20 MEK/toluene) was added to reduce the percent solids to 30%. Milling was then continued for another 30 minutes.

The dispersion was then allowed to cool and its fluidity was noted. It was then coated on to a polyester film substrate using a simple knife coating apparatus. The coating was allowed to dry at ambient conditions. The coated surface was analyzed with a Pacific Scientific 45° glossmeter and a Rodenstock RM400 Surface Finish Analyzer. The bulk magnetic properties of the coating were measured with a 3000 Oe MH Meter.

The pigment loading in these experiments makes provision for the addition of a high level of curative and other additives, but they were not added in the experiments outlined on Tables II and III.

TABLE II

Dispersions made with Dowa HM-77 Pigment at 88% Loading

| Example | Quaternary Binder Ex. # | COOH Binder Ex. # | Ratio | Binder Acid Content, meq/g | Quaternary Ammonium Content, meq/Kg | Rheology | Gloss | Rodenstock | Magnetic Performance, Gn |
|---|---|---|---|---|---|---|---|---|---|
| *Graft Carboxyl Polyurethane Dispersions* | | | | | | | | | |
| 21 | — | 15 | 100 | 0.55 | 18 | flows | 99 | 5.0 | 1.25 |
| 22 | — | 16 | 100 | 0.6 | 9.8 | flows | 97 | 4.8 | 1.22 |
| 23 | 10 | 3 | 50/50 | 0.6 | 4.1 | flows | 99 | 4.8 | 1.16 |
| 24 | 10 | 4 | 60/40 | 0.4 | 4.9 | flows | 95 | 5.4 | 1.12 |
| 25 | 10 | 3 | 60/40 | 0.6 | 4.9 | flows | 96 | 5.0 | 1.11 |
| 26 | 11 | 2 | 50/50 | 1.3 | 2 | flows | 82 | 4.9 | 1.08 |
| 27 | 10 | 2 | 50/50 | 1.3 | 4.1 | flows | 68 | 5.8 | 0.98 |
| 28 | 10 | 1 | 50/50 | 2.0 | 4.1 | flows | 42 | 7.7 | 0.86 |
| 29 | — | 3 | 100 | 0.6 | 0 | flows | 98 | 6.1 | 1.00 |
| 30 | — | 2 | 100 | 1.3 | 0 | flows (thick) | 49 | 9.4 | 0.79 |
| *Carboxyl Polyurethane Dispersions* | | | | | | | | | |
| 31 | 11 | 6 | 50/50 | 1.2 | 2 | flows | 26 | 22.8 | 0.93 |
| 32 | 10 | 5 | 50/50 | 2.7 | 4.9 | flows | 38 | 13.2 | 0.92 |
| 33 | 11 | 5 | 50/50 | 2.7 | 2 | flows (thick) | 35 | 8.4 | 0.79 |
| *Comparative Examples* | | | | | | | | | |
| Comp. 3 | 11 | Comp. 1 | 50/50 | 0.05 | 2 | gel | 83 | 9.7 | 0.98 |
| Comp. 4 | Estane™ 5703 | 3 | 50/50 | 0.6 | 0 | gel | 27 | 35.3 | 0.91 |
| Comp. 5 | UR8300 | 3 | 50/50 | 0.6 | 0 | gel | 78 | 6.0 | .97 |
| Comp. 6 | T17503 | 3 | 50/50 | 0.6 | 0 | gel | 56 | 12.4 | .89 |
| Comp. 7 | UR8300 | MR113 | 50/50 | 0 | 0 | gel | 62 | 14.5 | 1.07 |
| Comp. 8 | E-C130 | T17503 | 50/50 | 0.05 (estimate) | 2–4 (estimate) | gel | 77 | 9.1 | 1.09 |
| Comp. 9 | — | 5 | 100 | 2.7 | 0 | gel | * | * | * |

TABLE III

Dispersions Made with Toda B3 Pigment

| Example | Quaternary Binder Ex. # | COOH Binder Ex. # | Ratio | Pigment Loading, % | Binder Acid Content, meq/g | Quaternary Ammonium Content, meq/Kg | Rheology | Gloss | Rodenstock | Magnetic Performance, Gn |
|---|---|---|---|---|---|---|---|---|---|---|
| *Graft Carboxyl Polyurethane Dispersions* | | | | | | | | | | |
| 34 | 10 | 3 | 50/50 | 83 | 0.6 | 5.1 | flows | 78 | 6.1 | 1.60 |
| 35 | 10 | 3 | 60/40 | 83 | 0.6 | 6.1 | flows | 74 | 6.1 | 1.52 |
| 36 | 10 | 3 | 70/30 | 83 | 0.6 | 7.2 | flows | 67 | 7.2 | 1.43 |
| 37 | 10 | 3 | 80/20 | 83 | 0.6 | 8.2 | flows | 46 | 21.1 | 1.38 |
| 38 | 12 | 8 | 50/50 | 85 | 0.7 | 7.8 | flows | 51 | 10.5 | 1.33 |
| 39 | 10 | 8 | 50/50 | 85 | 0.7 | 7.8 | flows | 52 | 10.6 | 1.15 |
| 40 | 18 | 4 | 50/50 | 88 | 0.4 | 5.9 | flows | 66 | 7.3 | 1.15 |
| 41 | 10 | 14 | 50/50 | 88 | 0.3 | 5.9 | flows | 68 | 10.4 | 1.13 |
| 42 | 10 | 2 | 50/50 | 88 | 1.3 | 5.9 | flows | 53 | 6.7 | 1.12 |
| 43 | 10 | 1 | 50/50 | 88 | 2.0 | 5.9 | flows (thick) | 27 | 10.1 | 1.06 |
| 44* | Emcol™ CC-36 | 7/4 | 4/48/48 | 89 | 0.7/0.4 | 3.1 | flows | 89 | 6.3 | 1.13 |
| *Carboxyl Polyurethane Dispersions* | | | | | | | | | | |
| 45 | 12 | 6 | 50/50 | 85 | 1.2 | 5.9 | flows | 32 | 14.8 | 1.29 |
| 46 | 10 | 17 | 50/50 | 88 | 0.7 | 5.9 | flows | 57 | 9.7 | 1.11 |
| 47 | 10 | 6 | 50/50 | 88 | 1.2 | 5.9 | light gel | 23 | 18.0 | 1.05 |
| *Comparative Dispersions* | | | | | | | | | | |
| Comp. 10 | 10 | Comp. 2 | 50/50 | 88 | 0.05 | 5.9 | flows, but very rough | 23 | 42 | 1.07 |

*Example 44 uses Toda D1 pigment instead of Toda B3 pigment

These dispersion and coating examples demonstrate for two difficult to disperse magnetic pigments that the polymers and dispersions of the invention provide fluid rheology where alternative materials generally do not. While the graft carboxyl polyurethanes have the highest smoothness and best magnetics of all, the carboxyl polyurethane dispersions of the invention have a fluid rheology which is a valuable advantage in processing. Furthermore, these are test milling experiments. We have found that with more aggressive milling conditions, the carboxyl polyurethanes maintain a fluid rheology but develop much better magnetics, smoothness and gloss.

The examples further illustrate that quaternary ammonium polymers are effective in enhancing dispersion quality. In particular quaternary ammonium polyurethanes and quaternary ammonium functional non-halogenated vinyl copolymers are effective. It is also very effective to incorporate a quaternary ammonium polyol into the graft carboxyl polyurethanes.

III. Effect of Low MW Quaternary Ammonium Compound on Dispersions and Coatings.

Examples 48–53

Low molecular weight and oligomeric quaternary ammonium compounds can be used with the graft carboxyl polurethanes of the invention to produce dispersions of good quality. Using the same milling procedure described above, dispersions containing the magnetic particle Toda B3 with a mixture of the binders Estane™ 5703 and example 4 in the binder ratios noted were prepared, and their properties are shown in Table IV below.

Coating the Dispersion

The magnetic dispersion described above was coated onto a 26 gauge polyester film substrate having a carbon black backside coating. The coated substrate was passed through an orienting magnetic field and then through an oven set at 55° C. followed by another oven set at 82° C. The coated substrate was then calendered and rolled onto a core. The coated substrate was then slit to ¼ inch (6.35 mm), loaded into data cartridges, and tested for magnetic performance and durability.

The resulting magnetic recording medium showed a gloss of 119 and a Gn value of 2.09. It showed good edge quality and low error rates.

Data cartridges containing this media were cycled for 20,000 passes in a 41° F./10% RH environment as well as an 88° F./80% RH environment. Media errors were measured after every 5,000 passes. The media showed good durability in this test.

V. Preparation of Non-magnetic Backcoating

Examples 55–56

Dispersions were prepared by mixing the polymers noted in Table V below with methylethyl ketone and toluene solvents so that a 70/30 solvent ratio was obtained. The pigments were added and the premix was stirred for three hours using a Shar™ mixer. The premix was then sandmilled

TABLE IV

Effect of Low Molecular Weight and Oligomeric Quaternary Ammonium Compounds

| Example | Binder Ratio | Quaternary ammonium compound | Quaternary Ammonium Content, meq/Kg | Rheology | Gloss | Rodenstock | Magnetic Performance, Gn |
|---|---|---|---|---|---|---|---|
| 48 | 40/60 | None | 0 | gel | 26 | 37.1 | 1.37 |
| 49 | 33/67 | TBAC* | 3.1 | fluid | 58 | 6.0 | 1.20 |
| 50 | 33/67 | TBAC | 9.4 | fluid | 72 | 5.8 | 1.42 |
| 51 | 33/67 | Emcol ™ CC-36 | 3.1 | fluid | 86 | 5.4 | 1.43 |
| 52 | 40/60 | Emcol ™ CC-36 | 6.2 | fluid | 47 | 9.1 | 1.58 |
| 53 | 40/60 | Emcol ™ CC-36 | 12.4 | fluid | 52 | 7.8 | 1.50 |

*TBAC is tetrabutylammonium chloride

IV. Preparation of a Magnetic Recording Tape

Example 54

Preparation of the Dispersion

A combination of 2.4 kg methylethyl ketone and 0.8 kg of a 40.4% solution of the resin from example 4 in methylethyl ketone was mixed for 5 minutes. The mixing apparatus was then purged with $N_2$ gas.

To this mixture, 5.0 kg of iron metal particle and 0.7 kg of methylethyl ketone were added and the resulting mixture was transferred to a high shear double planetary mixer where it was mixed for 2 hours under a nitrogen atmosphere.

Next, 50 g of carbon black, 0.6 kg of alumina, 0.8 kg of a 40.7% solution of the resin from example 10 in methylethyl ketone were added, and mixing was continued for an additional hour.

The mixture was transfered to a 19 liter pail, whereupon 1.1 kg of methylethyl ketone and 2.0 kg toluene were added. The resulting mixture was mixed for 1 hour. Finally, 4.6 kg of methylethyl ketone and 0.5 kg toluene were added mixing was continued for 15 minutes.

The dispersion was milled in a sandmill (eight passes) until it was smooth. Just prior to coating, myristic acid (100 g), butyl stearate (100 g) and curative from example 13 (431 g) were added. The resulting dispersion was high shear mixed.

in a horizontal mill with a 1.0 mm ceramic media. Dispersion smoothness required several mill passes with a shaft speed of 1500 revolutions per minute at a flow rate of 0.25 gallons per minute. The smooth conductive dispersion required a second solvent charge and is filtered through a 0.5 micron filter. The controlled texture dispersion was not thinned with additional solvent or filtered.

At the time of coating, the smooth dispersion, textured dispersion and crosslinking agent (CB752 from Miles, Inc.) are Shar™ mixed together. The 20% solids mixture was passed through a 1.0 micron filter, gravure coated and calendered (1000–2000 psi at 100°–140° C.) for a final dry coating caliper of 25–55 microinches. The dispersions were coated onto a 26 gauge polyester film substrate.

The phosphonated polyurethane used in these examples was prepared as follows. To a 1-liter flask were added 67.9 g. Ravecarb™ 106 polycarbonate diol, 20.8 g neopentyl glycol (0.400 eq.), 11.8 g Fyrol™ 6 diol available from Akzo Chemical (0.093 eq.) and 127 g MEK. Then 84.5 g diphenylmethane diisocyanate (0.676 eq.) and 0.1 g. dibutyltin dilaurate were added. The mixture was heated at 80° C. for 2 hours. Then 46.6 g TONE™ 0305 and 69.5 g MEK were added. The mixture was heated at reflux for 1 hour. The inherent viscosity of the resultant polyurethane polymer in tetrahydrofuran was 0.302 dl/g.

The cured coated samples were tested using a Wyko Laser interferometer and an 8 mm data tape drive. Wyko RMS values of 16–20 nm showed that smooth backside coatings were made with both examples 55 and 56. The data tape drive was used to measure backside durability, tape drag and amound of debris. The tape path had a pair of stationary metal guides which the backside slid across during the forward and reverse cycling. A sample length of 15 meters was cycled at 2 meters/second in an 22° C./52% relative humidity environment. Test results showed that after 8000 cycles, both backside samples had excellent durability with minimal debris and stable tape drag of 0.1–0.2 Newtons.

TABLE V

Backside Coating Formulation

| | | Parts by weight solids | |
|---|---|---|---|
| | Ingredients | Example 55 | Example 56 |
| Smooth Conductive Dispersion | Example 2 (47.9% solids in MEK**) | 19.8 | |
| | Example 4 (37.1% solids in MEK**) | | 19.4 |
| | Example 10 (39.8% in MEK**) | 19.8 | 19.4 |
| | Black Pearls 2000 carbon black from Cabot Corp., Kokomo, IN | 14.1 | 13.8 |
| | P25 titanium dioxide from Degussa Corp., Teterboro, NJ | 28.1 | 27.5 |
| | Ceralox APA 0.4 alumina from Ceralox Corp., Tucson, AZ | 4.6 | 4.6 |
| | MEK (methylethyl ketone) | (29.2)* | (26.5)* |
| | MIBK (methyl isobutyl ketone) | (22.9)* | (19.9)* |
| | Toluene | (14.4)* | (16.6)* |
| Controlled Texture Dispersion | Thermax N991 carbon black from Cancarb Ltd., Medicine Hat, Alberta, Canada | 5.6 | 5.7 |
| | Example 11 (44.0% solids in MEK**) | 2.7 | 2.7 |
| | Phosphonated polyurethane resin (40.0% solids in MEK**) | 2.7 | 2.7 |
| | MEK (methylethyl ketone) | (2.0)* | (2.0)* |
| | Toluene | (1.5)* | (1.5)* |
| Crosslinking Agent | CB752 (75% solids in MEK**) from Miles, Inc., New Martinsville, WV | 2.6 | 4.2 |

*Denotes a 100% solvent component added to the dispersion (numbers indicate weight percentages of solvents used based on the total composition weight).
**Although the reagents listed in this table are often listed as being in a solvent, the parts by weight are by weight of the dry coating weight.

While this invention has been described in terms of specific embodiments it should be understood that it is capable of further modification. The claims herein are intended to cover those variations one skilled in the art would recognize as the equivalent of what has been done.

What is claimed is:

1. A magnetic recording medium comprising:
   (a) a substrate, and
   (b) a coating on at least one side of the substrate comprising:
      (1) a carboxyl polyurethane polymer comprising the reaction product of a mixture including:
         (A) a polyisocyanate, and
         (B) a mono-carboxylic acid functional polyol, wherein the carboxylic acid functional group is directly bonded to the backbone of the polyol though a carbon-carbon bond (C) wherein the number of isocyanate-reactive groups present in the mixture prior to reaction exceeds the number of isocyanate groups, and greater than 0.2 meq of the carboxylic acid groups are present on the carboxyl polyurethane polymer per gram of carboxyl polyurethane polymer,
   (2) a nonhalogenated vinyl copolymer including:
      (A) 5 to 40 parts by weight (meth)acrylonitrile,
      (B) 30 to 80 parts by weight nonhalogenated, nondispersing, vinyl monomer,
      (C) 5 to 30 parts by weight nonhalogenated, hydroxy functional, vinyl monomer, and
      (D) 0.25 to 10 parts by weight of a nonhalogenated, vinyl monomer bearing a dispersing group, and
   (3) a pigment.

2. The magnetic recording medium of claim 1, wherein the mixture of (b)(1) further includes a second polyol different than the carboxylic acid functional polyol.

3. The magnetic recording medium of claim 2, wherein the second polyol is an oligomeric diol.

4. The magnetic recording medium of claim 1, wherein the carboxylic acid functional polyol is a polyol of the formula:

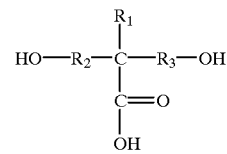

wherein $R_1$ is an alkyl group of 5 carbons or less, and $R_2$ and $R_3$ are independently selected from the group consisting of alkyl groups, aryl groups, aralkyl groups, polyester segments, polyether segments, and polycarbonate segments.

5. The magnetic recording medium of claim 1, wherein the carboxylic acid functional polyol has at least 1 meq of carboxylic acid groups present on the carboxyl polyurethane polymer per gram of carboxyl polyurethane polymer.

6. The magnetic recording medium of claim 1, wherein the nonhalogenated, nondispersing, vinyl monomer of (b)(2)(B) is styrene.

7. The magnetic recording medium of claim 1, wherein the nonhalogenated, hydroxy functional, vinyl monomer of (b)(2)(C) is 2-hydroxypropylmethacrylate.

8. The magnetic recording medium of claim 1, wherein the nonhalogenated, vinyl monomer bearing a dispersing group of (b)(2)(D) is methacryloyloxyethyl trimethyl ammonium chloride.

9. The magnetic recording medium of claim 1, wherein the nonhalogenated vinyl copolymer comprises:
   (a) 5 to 40 parts by weight (meth)acrylonitrile,
   (b) 30 to 80 parts by weight styrene,
   (c) 1 to 30 parts by weight 2-hydroxypropyl(meth) acrylate, and
   (d) 0.25 to 10 parts by weight methacryloyloxyethyl trimethyl ammonium chloride.

10. The magnetic recording medium of claim 9, wherein about 0.3 to about 30 millimoles of quaternary ammonium groups are present in the coating per kilogram of pigment.

11. The magnetic recording medium of claim 1, wherein the pigment is a magnetic pigment.

12. The magnetic recording medium of claim 1, wherein the pigment is a nonmagnetic pigment.

13. A magnetic recording medium comprising:
(a) a substrate, and
(b) a coating on at least one side of the substrate comprising:
  (1) a carboxyl polyurethane polymer comprising the reaction product of a mixture including:
    (A) a polyisocyanate, and
    (B) a mono-carboxylic acid functional polyol, wherein the carboxylic acid functional group is directly bonded to the backbone of the polyol though a carbon-carbon bond
    (C) wherein the number of isocyanate-reactive groups present in the mixture prior to reaction exceeds the number of isocyanate groups, and greater than 0.2 meq of the carboxylic acid groups are present on the carboxyl polyurethane polymer per gram of carboxyl polyurethane polymer,
  (2) a nonhalogenated vinyl copolymer including:
    (A) 5 to 40 parts by weight (meth)acrylonitrile,
    (B) 30 to 80 parts by weight nonhalogenated, nondispersing, vinyl monomer,
    (C) at least 1 to less than 5 parts by weight nonhalogenated, hydroxy, functional, vinyl monomer, and
    (D) 0.25 to 10 parts by weight of a nonhalogenated, vinyl monomer bearing a dispersing group, and
  (3) a pigment.

14. The magnetic recording medium of claim 13, wherein the carboxylic acid functional polyol is a polyol of the formula:

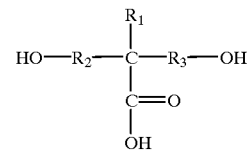

wherein $R^1$ is an alkyl group of 5 carbons or less, and $R^2$ and $R^3$ are independently selected from the group consisting of alkyl groups, aryl group, aralkyl groups, polyester segments, polyether segments, and polycarbonate segments.

15. The magnetic recording medium of claim 14, wherein the carboxylic acid functional polyol has at least 1 meq of carboxylic acid groups present on the carboxyl polyurethane polymer per gram of carboxyl polyurethane polymer.

16. The magnetic recording medium of claim 13, wherein the nonhalogenated, nondispersing, vinyl monomer of (b)(2)(B) is styrene.

17. The magnetic recording medium of claim 13, wherein the nonhalogenated, hydroxy functional, vinyl monomer of (b)(2)(C) is 2-hydroxypropylmethacrylate.

18. The magnetic recording medium of claim 13, wherein the nonhalogenated, vinyl monomer bearing a dispersing group of (b)(2)(D) is methacryloyloxyethyl trimethyl ammonium chloride.

* * * * *